US010136173B2

(12) United States Patent
Lewis et al.

(10) Patent No.: US 10,136,173 B2
(45) Date of Patent: *Nov. 20, 2018

(54) CONDITIONAL DISPLAY OF HYPERLINKS IN A VIDEO

(71) Applicant: Google LLC, Mountain View, CA (US)

(72) Inventors: Justin Lewis, Marina del Rey, CA (US); Ruxandra Georgiana Paun, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/217,471

(22) Filed: Jul. 22, 2016

(65) Prior Publication Data

US 2016/0330499 A1 Nov. 10, 2016

Related U.S. Application Data

(63) Continuation of application No. 14/081,745, filed on Nov. 15, 2013, now Pat. No. 9,417,765.

(Continued)

(51) Int. Cl.
| | |
|---|---|
| *G06F 3/048* | (2013.01) |
| *H04N 21/2668* | (2011.01) |
| *G06F 3/0482* | (2013.01) |
| *H04N 21/258* | (2011.01) |
| *H04N 21/431* | (2011.01) |
| *H04N 21/472* | (2011.01) |
| *H04N 21/4782* | (2011.01) |
| *H04N 21/4788* | (2011.01) |
| *H04N 21/61* | (2011.01) |
| *H04N 21/858* | (2011.01) |
| *G06F 17/30* | (2006.01) |

(52) U.S. Cl.
CPC ....... *H04N 21/2668* (2013.01); *G06F 3/0482* (2013.01); *G06F 17/30855* (2013.01); *H04N 21/25891* (2013.01); *H04N 21/4316* (2013.01); *H04N 21/4782* (2013.01); *H04N 21/4788* (2013.01); *H04N 21/47202* (2013.01); *H04N 21/6125* (2013.01); *H04N 21/858* (2013.01)

(58) Field of Classification Search
CPC ........................... G06F 3/0481; G11B 27/036
USPC ....................................................... 715/719
See application file for complete search history.

(56) References Cited

U.S. PATENT DOCUMENTS

| | | |
|---|---|---|
| 8,069,414 B2 | 11/2011 | Hartwig et al. |
| 8,209,396 B1 | 6/2012 | Raman et al. |

(Continued)

OTHER PUBLICATIONS

Office Action dated Sep. 14, 2015 in U.S. Appl. No. 14/081,745.

*Primary Examiner* — Matthew Ell
(74) *Attorney, Agent, or Firm* — Byrne Poh LLP

(57) ABSTRACT

Systems and methods are provided for dynamically displaying hyperlinks in a video based on various factors associated with a device at which the video is played and/or a user of the device. In one or more aspects, a system includes a request component configured to receive a request to play a video hosted by a media provider. The system further includes a selection component configured to select a subset of links included in a set of links associated with the video to provide with the video when it is played in response to the request based in part on a number of links included in the set of links, wherein graphical elements respectively representative of the links included in the subset of links are configured to be displayed over the video when the video is played in response to the request.

19 Claims, 16 Drawing Sheets

Related U.S. Application Data

(60) Provisional application No. 61/862,941, filed on Aug. 6, 2013.

(56) References Cited

U.S. PATENT DOCUMENTS

| | | |
|---|---|---|
| 2008/0077952 A1 | 3/2008 | St. Jean et al. |
| 2008/0275755 A1 | 11/2008 | Brustein et al. |
| 2009/0165041 A1 | 6/2009 | Penberthy et al. |
| 2010/0005488 A1 | 1/2010 | Rakib et al. |
| 2010/0070962 A1 | 3/2010 | Sinn et al. |
| 2010/0186041 A1 | 7/2010 | Chu et al. |
| 2011/0197224 A1 | 8/2011 | Meijer |
| 2013/0227398 A1 | 8/2013 | Bolstad |

CONDITIONAL DISPLAY OF HYPERLINKS IN A VIDEO

CROSS-REFERENCE TO RELATED APPLICATIONS

This application is a continuation of U.S. patent application Ser. No. 14/081,745, filed Nov. 15, 2013, which claims the benefit of U.S. Provisional Application No. 61/862,941, filed Aug. 6, 2013, which are incorporated herein by reference in their entireties.

TECHNICAL FIELD

This application generally relates to systems and methods for displaying one or more hyperlinks in a video based on various factors associated with a device at which the video is played and a user of the device.

BACKGROUND

Videos streamed to users over a network (e.g., the Internet) are often presented with several clickable links integrated therein that are configured to be displayed on or within image data of the video. For example, a video advertisement may include links to websites with more information about items marketed in the video advertisement, links to share the video advertisement on a social network profile page of the viewer, links to email the video advertisement to a friend, links to purchase items marketed in the video advertisement, etc. However, links provided with a video for display with the video are generally fixed and do not adapt to account for preferences of a current viewer and restrictions of a device at which the video is to be played.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
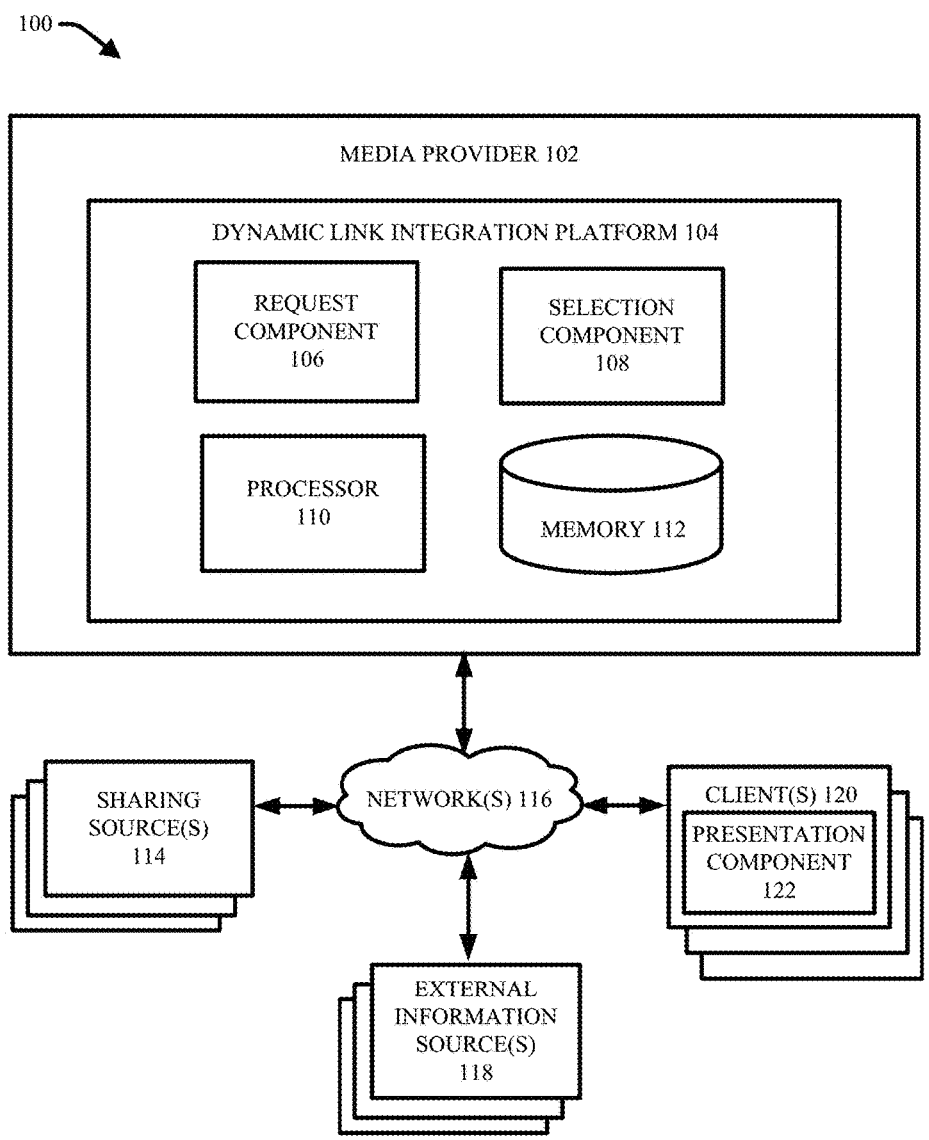
FIG. 1 illustrates an example system for dynamically displaying hyperlinks in a video based on various factors associated with a device at which the video is played and a user of the device, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for dynamically selecting a subset of hyperlinks for displaying over a video based on various factors associated with a device at which the video is played and/or a user of the device. The subset of hyperlinks are selected from a set of hyperlinks including links pre-associated with the video and links dynamically generated based in part on factors associated with the user (e.g., user preferences, user location, user sharing history, etc.). As described herein, reference to display of a link or hyperlink with or over a video refers to integration of a graphical element or icon representative of the link or hyperlink over (e.g., as an overlay) or within image data of the video within the dimensions of the display area (e.g., video player) in which the video is played.

For example, when a video is provided to a media sharing system, the provider of the video can include a set of hyperlinks the provider of the video would like to be displayed over video each time the video is played. However, each of these pre-associated links may not be appropriate for displaying over the video each time it is played based on various reasons, including but not limited to, size of a display screen at which the video will be played (e.g., each of the links may not fit over the video when displayed on relatively small display screen) and preferences of the user who selected the video for playing. For example, a link provided with the video for sharing the video on a social network the viewing user does not belong should not take precedence over a link to a social network the user visits daily, especially when only a subset of provided links can fit over the video based on a size of the display screen of the device at which the video will be played.

In an aspect, in response to selection of a video provided by a streaming media, a dynamic link integration platform associated with the streaming media provider can analyze preferences of the user and/or hardware and software capabilities of the device at which the video is to be played (e.g., the device from which the user initiated the selection of the video). Based on its analysis, the dynamic link integration platform can examine a set of links stored in memory accessible to the dynamic link integration platform and determine or infer a subset of the links to display over the video when the video is played. The subset of links will be tailored to the particular user and/or the device of the user. For example, the subset of links can include sharing links that facilitate sharing the video on social networks the user generally shares information on. In another example, the subset of links can include links for sources associated with a current location of the device. In another example, the number of links included in the subset of links can be a function of the size of the display area in which the video will be presented.

With the subject method, different users can view the same video and the subsets of links displayed over the video will vary depending on preferences of the respective users. In addition, a single user can view a same video on different devices and the subset of links displayed over the video will vary based on dimensions of the display screens of the respective devices.

In one or more aspects, a system is provided that includes a request component configured to receive a request to play a video hosted by a media provider. The system further includes a selection component configured to select a subset of links included in a set of links associated with the video to provide with the video when it is played in response to the request based in part on a number of links included in the set of links, wherein graphical elements respectively representative of the links included in the subset of links are configured to be displayed over the video when the video is played in response to the request (e.g., as elements overlaid onto image data of the video).

In another aspect, a method is disclosed that includes receiving a request to play a video hosted by a media provider. In response to receiving the request, the method further includes selecting a subset of links included in a set of links associated with the video to provide with the video when it is played in response to the request, wherein the selection is based in part on a number of links included in the set of links, wherein graphical elements respectively representative of the links included in the subset of links are configured to be displayed with the video when the video is played in response to the request, and the selection is further based in part on context of a user or display device.

Further provided is a tangible computer-readable storage medium comprising computer-readable instructions that, in response to execution, cause a computing system to perform various operations. These operations can receiving a request to play a video hosted by a media provider, and selecting a subset of links included in a set of links associated with the video to provide with the video when it is played in response to the request, wherein the selection is based in part on dimension of a display screen of a device at which the video will be played in response to the request, wherein graphical elements respectively representative of the links included in the subset of links are configured to be overlaid onto the video when the video is played in response to the request.

Referring now to the drawings, with reference initially to FIG. 1, presented is a diagram of an example system 100 for dynamically displaying hyperlinks in a video based on various factors associated with a device at which the video is played and/or a user of the device, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102 including dynamic link integration platform 104, one or more sharing sources 114, one or more external information sources 118 and one or more client devices 120. System 100 also includes one or more networks 116 connecting clients 120, sharing sources 114, external information sources 118, media provider 102 and dynamic link integration platform 104. Dynamic link integration platform 104 can include memory 112 for storing computer executable components and instructions. Dynamic link integration platform 104 can further include a processor 110 to facilitate operation of the instructions (e.g., computer executable components and instructions) by the dynamic link integration platform 104.

Media provider 102 can include an entity that provides media content to client devices 120 via network 116 (e.g., the Internet). As used herein the term media content or media item can include but is not limited to streamable media (e.g., video, live video, animations, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

In an aspect, media provider 102 is configured to provide streamed media to client devices 120 over a network 116.

The media can be stored in memory 112 and/or at various servers employed by media provider 102 and accessed via client devices 120 using a website platform of the media provider 102. For instance, media provider 102 can provide and present media content to a user via a website that can be accessed by a client device 120 using a browser. In an aspect, media provider 102 can include a media presentation source that has access to a voluminous quantity (and potentially an inexhaustible number) of shared media (e.g., video and/or audio) files. The media presentation source can further stream these media files to one or more users at respective client devices 120 of the one or more users over a network 116. In an aspect, media provider 102 can also receive media from one or more client devices 120 over a network 116. For example, users can upload videos to media provider 102 via client devices 120, for sharing with other users by media provider 102.

A sharing source 114 can include any networked resource that can receive and provide links or hyperlinks to media, provided by media provider 102, over network 116 (e.g., the Internet). For example, user's viewing a video provided my media provider may desire to share a link to the video with a friend, on their blog, or on a social networking profile. A sharing source 114 includes a network location or device at which such a link to a video (or other type of media or information) provided by media provider 102, is shared via posting at the sharing source 114 or sending to the sharing source in an electronic messages (e.g. an email, multimedia message, short messaging service (SMS) text message, etc.). A sharing source 114 can include a website, an application, or a document that can include a link to a video, provided by media provider 102. A shared link to a video can be displayed at a sharing source 114 in association with a still image representation of the video and/or in association with an embedded video player configured to play the video. Example sharing sources 114 can include but are not limited to: a social networking services website, a website that compiles photos and/or links to information found interesting to users at various other websites, a website that provides news articles and news multimedia to users, a website that provides written reviews of places and things, a website that provides products for purchasing, or a website that provides educational services and information.

It should be appreciated that the types of sharing sources 114 described above are merely exemplary and that system 100 (and additional systems described herein) can be employed with a vast array of sharing sources. For example, any suitable device, application, or document that can receive and provide a link or hyperlink to a video provided by media provider 102 can constitute a sharing source 114. Further, although sharing sources 114 are depicted remote from client devices 120, in an aspect, a sharing source can be provided at client device 120. For example, client device 120 can include an application that provides and/or receives hyperlinks to videos provided by media provider 102. In another example, client device 120 can store and/or provide a document that includes a hyperlink to a video provided by media provider 102.

An external information source 118 can include any suitable network source that is not classified as social network and provides information that can be linked to. For example, an external information source 118 can include a website that provides information, a merchant website, or a user's personal website. In certain aspects, an external information source 118 can also function as a sharing source 114. For example, when playing the role of a sharing source 114, the external information source 118 can receive a link to a video (e.g., provided by media provider 102) posted thereto.

As used herein, the term link or hyperlink refers to an object or item that serves as a reference to remote data. Hyperlinks are used by networked computing entities (e.g., media provider 102, sharing sources 114, external information sources 118, etc.) to link information to other information over a network (e.g., the Internet). The terms link and hyperlink are used herein interchangeably. A link can be selected by a user to present the user with the data represented by the link. The effect of selecting a link can vary with the hypertext system used to generate the link and may sometimes depend on the link itself. For instance, on the World Wide Web, most hyperlinks cause a target object to replace an object being displayed, but some are marked to cause the target document to open in a new window. Another possibility is transclusion, for which the link target is a document fragment that replaces a link anchor within the source document.

A link or hyperlink can be presented to a user in various forms or objects that allow a user to click on or select the link to arrive at the data object represented by the link. For example, a link can be displayed as text (e.g., a string of characters including a uniform resource locator (URL) for a webpage represented by the link), an image, a thumbnail, a video or any object or combination of objects that is representative of the data it refers to. For example, a link to a social network profile page for a company or product referenced can be represented by an icon indicative of the social network or product. In another example, a link to a webpage for product can be represented by a thumbnail image of the product or logo for the product.

Links or hyperlinks can be integrated in various mediums, including but not limited to, a document, a webpage, an image, a video, or an animation. Aspects of the subject disclosure are exemplified with respect to links or hyperlinks that can be integrated over a video provided by media provider 102. However, it should be appreciated that various aspects of the subject disclosure can facilitate dynamic selection of links and integration of those links into other mediums (e.g., a still image, a webpage, a document, etc.). Links or hyperlinks that can be provided in videos or other mediums in accordance with aspects of the subject disclosure can include but are not limited to: incline links, anchor links, hyperlinks in hypertext markup language (HTML), or hyperlinks in extensible markup language (XML).

As noted above, when a link is displayed with or over a video, a graphical element or icon (e.g., an image, a logo, etc.) representative of the link is displayed over (e.g., as an overlay) or within image data of the video. In particular, graphical elements representative of links are displayed within the same display space as the video. For example, graphical elements representative of links can be overlaid onto image data of the video as the video is played. In another example, the graphical elements representative of links can be displayed within the video display area of a video player as the video is being played in the video player. These graphical elements can further be clicked on to effectuate selection of the links represented by the respective graphical elements.

Client device(s) 120 can include any suitable computing device associated with a user and configured to interact with media provider 102, sharing source(s) 114, external information source(s) 118, and/or dynamic link integration platform 104. For example, client device 120 can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs system 100 (or additional systems described in this disclosure) using client device 120. Network(s) 116 can include wired and wireless networks, including but not limited to, a cellular network, a wide area network (WAD, e.g., the Internet), a local area network (LAN), or a personal area network (PAN). For example, a client device 120 can communicate with a sharing source 114 and media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Dynamic link integration platform 104 facilitates dynamically selecting links for displaying over a video when the video is played (e.g., streamed from media provider to a client device 120 via a network 116) based on various conditions associated with a client device 120 as which the video is to be played and/or a user of the client device 120. In an aspect, the links are selected from a set of links that includes pre-associated links provided with the video when received by media provider 102 as selected and configured by the uploader of the video or creator of the video. Accordingly, dynamic link integration platform 104 facilitates dynamically selecting a subset of pre-associated links to display over a video that are suitable for displaying over the video each time the video is played based on the device at which the video is to be played and/or a user of the device.

In another aspect, the set of links from which the subset of links are selected also include links provided by media provider 102 and/or generated by dynamic link integration platform 104. These media provider generated links can be stored in memory 112 and/or dynamically generated in response to a request for a video. Media provider generated links include links generated and configured by media provider 102. Media provider links include links that media provider 102 would like to potentially display over a video when it is played (e.g., as opposed to pre-associated links selected by a creator/uploader of the video). Media provider links can be applied by dynamic link integration platform 104 to any video provided by media provider 102.

Dynamic link integration platform 104 can include request component to receive requests from client devices 120 to play videos provided by media provider 102. For example, using client devices 120, a plurality of users can access shared videos provided by media provider 102 and select videos for playing. In an aspect, users can access the shared the videos provided by media provider 102 at a webpage hosted by the media provider 102 or at a sharing source 114 at which a link to a video provided by media provider, or an embedded video provided by media provider 102, is located.

Request component 106 can also receive requests to automatically play videos provided by media provider 102. According to this aspect, media provider 102 can be configured to automatically begin streaming a video to a client device 120 for playing at the client device 120 in response to various conditions or signals. For example, media provider 102 can be configured to automatically begin streaming a video to a client device 120 (wherein streaming of the video results in the playing of the video at the client device) in response to selection of a link to the video (provided by media provider 102) located at a sharing source 114. In another example, media provider 102 can automatically begin streaming a video to client device as a function of context of the client device, content of the video, visibility of a video player in which the video is played at the client device, opening of a browser window or tab at the that includes the video, or various additional conceivable factors. Signals that prompt media provider 102 to automatically begin streaming a video to a client device 120 can further be received by request component 106 and interpreted as requests to play a video at the client device 120.

In response to reception of a request to play a video provided by media provider 102, media provider 102 can stream the video to the client device 120 associated with the request via a network 116. In an aspect, media provider 102 is configured to steam advertisement multimedia in association with a video for which a request to play the video is received. For example, media provider 102 can stream an advertisement video with a requested video such that the advertisement video is played before (e.g., a pre-roll video advertisement), during (in-stream advertisement), or after (post-roll advertisement) the requested video. According to this aspect, media provider 102 can select a video advertisement to provide with a requested video or the video advertisement can be pre-associated with the requested video.

Selection component 108 is configured select links for presentation with or over a requested video, or an advertisement video associated with a requested video, (or other requested data object such as an image, a webpage, a document, etc.) based on conditional factors associated with the request for the video. In particular, selection component 108 can select a subset of links for displaying over a requested video and/or an advertisement video associated with the requested video based in part on a user associated with the request and/or operating parameters of a device associated with the request (e.g., the device at which the video will be played). In an aspect, selection component 108 is configured to select the subset of links from a set of links including links pre-associated with the requested video or video advertisement.

For example, videos (including advertisement videos) provided by media provider 102 can be viewed by a plurality of different users on plurality of different types of client devices. These videos are often uploaded or otherwise provided to media provider 102 with hyperlinks pre-associated therewith that are configured to be displayed over the video when it is played. For example, a video advertisement may be provided to media provider 102 for displaying as a pre-roll in association with videos provided by media provider 102. The video advertisement can be provided to media provider 102 with pre-associated links the owner of the video advertisement has selected for displaying with the video advertisement. For example, the pre-associated links may include links to websites with more information about items marketed in the video advertisement, links to share the video advertisement on a social network profile page of the viewer, links to email the video advertisement to a friend, links to purchase items marketed in the video advertisement, etc.

However, links provided with a video (including an advertisement video) uploaded to media provider 102 for sharing with a plurality of users are generally fixed and do not adapt to account for preferences of a current viewer and restrictions of a device at which the video is to be played. For various reasons, links included or pre-associated with a video received by media provider 102 for dissemination thereof may not be suitable for displaying over the video. For instance, where the video is played on a device having a relatively small display screen, multiple icons or graphical elements representing the links may not fit within the area of the display screen in which the video is displayed. In another aspect, a link provided with a video for display with the video may be inappropriate for a user based on the user's preferences. For example, a user who does not participate in social network ABC should not be presented with a link to share the video at social network ABC.

In view of the above examples, in an aspect, selection component 108 can select one or more links from a set of links provided with a video to integrate with the video when a requested. At the time of the request, selection component 108 can analyze various factors associated with the device at which the video or video advertisement is to be played and the user of the device, to determine or infer which of the pre-associated should be displayed with the video (e.g., as integrated within image data of the video and/or overlaid onto image data of the video).

In an aspect, when a video is received by media provider 102 (e.g., in response to initial uploading of the video), dynamic link integration platform 104 can identify any links pre-associated with the video. The pre-associated links can then be keyed to the video in memory 112 (or other database accessible to dynamic link integration platform. When a video is requested or otherwise selected for playing at client device 120 (e.g., automatically as in the case of a pre-roll advertisement video), selection component 108 can identify any links pre-associated with the video in memory 112 and include these links in the set of links from which it selects a subset of links for displaying with the video.

In addition to pre-associated links, the set of links from which selection component 108 selects a subset of links to display over a video can also include links provided by media provider 102 and stored in memory 112 and/or links generated by dynamic link integration platform 104, as discussed in greater detail infra. The set of links from which selection component 108 dynamically selects a subset of links for displaying with a video includes three different types of links; sharing links, social network profile (SNP) links, and external information source links.

Sharing links include links that allow users to share a video associated with the sharing link with other users (e.g., via posting a link to the video at a sharing source 114, embedding the video at a sharing source 114, sending a link to the video in an electronic message, initiating a concurrent viewing session of the video, etc.). For example, selection of a sharing link provided in a video streamed by media provider 102 can result in posting of a link to the video or embedding the video at a source represented by the sharing link. In an aspect, sharing links allow users to share links to videos provided by media provider 102 with other users at sharing sources 114 and/or embed videos provided by media provider 102 at sharing sources 114. For example, selection, by a user, of a sharing link associated with a video can generate a link to the video (e.g., a URL to the video at media provider 102) or embed code for a video that facilitates embedding the video at a sharing source 114 in a video player. The link or embed code can be provided to the user in a dialogue box. A user can then copy and paste the link or embed code at a sharing source 114.

In another example, a sharing link can be configured to automatically share a link to a video or embed the video at a particular sharing source 114 represented by the sharing link in response to selection of the sharing link. In particular, a sharing link for a social network can be configured to effectuate posting of a link to a video or embedding a video associated with the link at an account or profile page for a user who selects the sharing link. For example, a sharing link to social network "Keeping up with Friends" can be displayed with a video entitled "Snazzy Sneakers Dance" viewed by user Amy Adams. While watching the video, Amy may decide to share the video on her social network profile page at social network "Keeping up with Friends." Accordingly, Amy can select the sharing link for social network "Keeping up with Friends." In response to selection of the sharing link, a link to the video and/or an embedded video can be posted at Amy's Keeping up with Friends profile page. According to this aspect, a user can have established profiles or accounts at various social networks. Sharing links for each of these social networks can be displayed with a video views by the user. In response to selection of the respective sharing links by the user in association with viewing the video, a link to the video or an embedded player for playing the video can be posted at the user's account or profile page at the respective social networks.

In another aspect, a sharing link can include a link that effectuates sending a link to a video, or sending an embedded video, in an electronic message (e.g., an email, multimedia message, SMS text message, etc.). According to this aspect, sharing links can include but are not limited to: a link to send an email with a link to a video in which the sharing link is provided, a link to send a multimedia message with a link to a video in which the sharing link is provided, or a link to send an SMS message with a link to a video in which the sharing link is provided.

In some aspects, a URL for a video that gets posted or sent in response to selection of a sharing link provided in the video includes a URL for a the video at a network location other than media provider 102. For example, although a video advertisement for company Snazzy Sneakers Inc. is initially provided to a user by media provider 102, a sharing link displayed in the video can generate a URL for a version of the video advertisement provided at a company website for Snazzy Sneakers Inc. Similarly, in some aspects, an embedded video player configured to play the video that gets posted in response to selection of the sharing link can include a video player that is configured to play the video as streamed from a network entity remote from media provider 102. However, in a preferred embodiment, sharing links included in videos provided by media provider 102 are configured format and post shared links to videos with URLs at media provider 102 and embedded videos that are configured to play videos as streamed by media provider 102.

SNP links include links to an account or profile page at a social network for a specific entity. As discussed with respect to sharing links, users can have established profiles or accounts at various social networks. In addition to individual users entities can create social network accounts for a company or even a product. For example, company Snazzy Sneakers Inc. can create a social network profile page at social network "Keeping up with Friends." SNP links include links that link directly to a particular social network profile or account for a particular user or entity. For example, a video advertisement for Snazzy Sneakers Inc. can include a SNP link to the social network profile page for Snazzy Sneakers Inc. at social network "Keeping up with Friends." Selection of this SNP link can result in opening of window in which Snazzy Sneaker Inc.'s Keeping up with Friends profile page is displayed. In another example, a video in which actress Erin Colleen appears can include a SNP link to Erin Colleen's personal profile page at social network "Keeping up with Friends."

External information source links can include links or hyperlinks to information provided by an external information source 118 that is not a social network profile or account. For example, external links can include links to an individual's or company's website, links to an article about a product, links to a website where a user can purchase a product, links to a website that provides informational services, etc. It should be appreciated that a vast array of external information source links to information available on the World Wide Web exist and can be provided with videos in accordance with the subject disclosure.

As noted above the set of links from which selection component 108 dynamically selects a subset of links for display with a video can include pre-associated links keyed to the video in memory 112 (e.g., links provided with a video when the video is received by media provider) and links generated or provided by media provider 102 or dynamic link integration platform 104. As described herein, links provided with a video when the video is received by media provider 102 are referred to a pre-associated video links or links that are pre-associated with the video and links that are generated by media provider 102 are referred to as media provider links. In an aspect, selection component 108 is configured to combine pre-associated links and media provider links associated with a video to establish the set of links from which it selects a subset of links for displaying over the video.

In an aspect, pre-associated video links can include sharing links, SNP links and external information source links. For example, when a user provides a video to media provider 102 for distribution thereof, the user can include links with the video for display with the video when the video is played by media provider 102. In an aspect, the creator or uploader of the video can manually select links to associate with the video when the video is uploaded. In another aspect, a video creator or uploader of a video can configure metadata that is associated with the video and defines links to display with the video when the video is streamed to users by media provider. This metadata can be extracted by dynamic link integration platform 104 to any identify pre-associated for the video. Pre-associated links can be stored by dynamic link integration platform 104 in a table keyed to identifiers (IDs) for videos associated with the respective pre-associated links. When a video is requested, dynamic link integration platform 104 can generate a set of links that includes any links pre-associated with the video using the table in memory 112.

Media provider generated links include links generated and/or configured by media provider 102. Media provider links include links that media provider 102 would like to potentially display over a video when it is played (e.g., as opposed to pre-associated links selected by a creator/uploader of the video). Media provider links can be applied by dynamic link integration platform 104 to any video provided by media provider 102. Similar to pre-associated links, media provider generated links can also include sharing links, SNP links and external information source links. For example, dynamic link integration platform 104 can store (e.g., in memory 112) N number of pre-configured media sharing links for various sharing sources 114, where N is an integer. According to this example, memory 112 can store 50 pre-configured sharing links for 50 different social networking websites. Each of the 50 links can be configured to effectuate sharing a link to a video (and/or embedding the video) in which the respective links are displayed, at a user profile/account at the respective social networking networks.

In an aspect, links that can be included in a set of links analyzed by selection component 108 are stored (e.g., in memory) or otherwise provided in association with information defining a URL for the link and a graphical element to represent the link when displayed over a video. Information describing the dimensions of the graphical element can also be associated with the link. Dynamic link integration platform 104 can also associate information with a link (e.g., stored in memory 112) that defines what size a newly opened window should be in response to selection of the graphical element representative of the link and whether the window should be opened in a new tab of a browser window in which the video is displayed, a same tab of a browser window in which the video is displayed, or in a popup. Each link or hyperlink can also include a title or tooltip. In an aspect, dynamic link integration platform 104 can configure links for display with a video such that interaction with an element representative of a link (e.g., moving a cursor over the element or hovering over the element) results in display of the title or tooltip for the link.

In an aspect, in order to generate a set of links for a video from which to select a subset of links to display with the video in response to a request for the video, dynamic link integration platform 104 combines media provider generated links stored in memory 112 with pre-associated links identified for the video. Selection component 108 can then select a subset of links form this set of links to display with the video in response to the request. As a result, the number of links displayed with a video can be greater than the number of pre-associated links originally provided with the video. In another aspect, discussed infra with respect to FIG. 6, dynamic link integration platform 104 can filter the media provider generated links to a subset of media provider generated links in response to the request. This filtered subset of media provider generated links is referred to herein as dynamically generated media provider links. Dynamic link generation platform can then establish the set of links for a video from which to select a subset of links to display with the video by combining this filtered subset of media provider generated links and the pre-associated links for the video.

Selection component 108 is configured dynamically select a subset of links from a set including pre-associated video links and/or media provider generated links, to display with a video (e.g., as overlays or as integrated with video data of the video) in response to a request to view or play the video. In an aspect, the subset of links can include all links included in the set (e.g., the subset of links can equal the set of links). In another aspect, the subset of links can include a subset of pre-associated video links and/or a subset of media provider generated links. Selection component 108 can analyze a variety of factors or conditions associated with the request to determine or infer which links to select from the set for inclusion in the subset of links to display with the video. In an aspect, selection component 108 can employ various algorithms stored in memory that weight these factors or conditions to determine or infer the subset of links to display with the video.

In an aspect, in association with trimming down a set of links to arrive at a subset of links to display with a video, selection component 108 can filter the set of links by replacing pre-associated links for which a duplicate or substantial duplicate media provider link exists with the duplicate media provider link. For example, a pre-associated links for may become outdated or configured with parameters that are not desired by media provider 102. Accordingly, when selection component 108 identifies a pre-associated link for which a media provider version of the link exists, selection component 108 can replace the pre-associated link with the media provider version of the link in the set of links from which selection component selects a subset of links for displaying with a video. For example, a pre-associated sharing link that facilitates sharing a link to the video associated with the link at social network website "mybookoffriends.com" may be configured to share a link for a video wherein the URL associated with the link is a link to a version of the video hosted at a network location (e.g., a website) that is unaffiliated with media provider 102. Thus when a user selects the pre-associated version of the link posted at "mybookoffriends.com" the user will be brought to a network location that is unaffiliated with media provider 102, as opposed to a website hosted by media provider. Accordingly, selection component 108 can be configured to replace the pre-associated sharing links with a media provider generated sharing specifically configured to share URLs that link to videos located at a webpage hosted by media provider 102 and/or share embedded video players configured to play videos as streamed by media provider 102.

Selection component 108 can further filter the set of links based on various conditional parameters related to at least one of: display screen of the device at which the video is to be played, operating parameters of the device at which the video is to be played, location of the device at which the video is to be played, context of the device at which the video is to be played, preference of the viewing user, demographics of the viewing user, a location associated with the viewing user, sharing history of the viewing user, and social network affiliations of the viewing user.

In an aspect, selection component 108 can determine or infer the subset of links to display over the video at least as a function of a number of links included in the set and a number of links considered appropriate for displaying over the video (e.g., based on a total number of links that can fit within the dimensions of the display area of the video based on size of the display screen of the device at which the video is to be played). For example, selection component 108 can apply threshold requirements with respect to the total maximum and minimum number of links to include in a subset, the total maximum and minimum number of pre-associated links to include in a subset and/or the total maximum and minimum number of media generated links to include in a subset. In one embodiment, the total maximum number of links that can be included in a subset can be an arbitrary number applied by dynamic link integration platform 104. In another embodiment, the total maximum number of links that can be included in a subset must be equal to or less than the number of pre-associated links for the video. In another example, selection component 108 can limit the total number of links to X (e.g., 10), wherein the number of pre-associated links to less than or equal to X−1, and the number of media generated links is less than or equal to X, where X is a number.

In another example, selection component 108 can apply restrictions whereby the number of pre-associated links included in a subset is dependent on the number of media generated links included in the subset, and vice versa. For instance, selection component 108 can apply number restrictions whereby the number of pre-associated links included in a subset must equal the number of media generated links, or whereby the number of whereby the number of pre-associated links included in a subset must be less than the number of media generated links, or whereby the number of pre-associated links included in a subset must exceed the number of media generated links.

In some aspects, number restrictions regarding maximum/minimum numbers of total links, pre-associated links, and/or media generated links to be included in a subset of links for display with a video can correspond to device display requirements. For example, the number restrictions regarding maximum numbers of total links, pre-associated links, and/or media generated links that can be included in a subset of links for display over a video presented on a display screen with dimensions less than G×H (where G and H are numbers) can be different (e.g., more restrictive such that fewer links can be included in the subset) than the number restrictions associated with presentation of the video at a display screen with dimensions greater than G×H.

In another aspect, selection component 108 can determine or infer the subset of links based on factors associated with the device at which the video is to be displayed. According to this aspect, selection component 108 can determine which links to include in the subset based in part on device display screen dimensions, dimensions of graphical elements representing respective links, how the graphical elements are to be arranged over the video, device operating parameters or system(s), device context, device location, or applications provided on the device. For example, selection component 108 can analyze the dimensions of a video display area at which the video will be displayed and analyze the dimensions of the graphical elements or icons respectively representing the links included in the set to determine which links and how many of the links, can fit within the dimensions of the video display area. Such analysis can also consider spacing between graphical elements and how the graphical elements are to be arranged over the video (e.g., in a single horizontal row at the bottom of the video, in a vertical column, at disparate corners, etc.). In another example, when a device is located in Japan, a sharing link that is associated with a group of users in the United States may not be as relevant as a sharing link that reaches a group of users in Japan. Accordingly, selection component 108 can determine or infer that the sharing links associated with Japan should be included in the subset and the sharing link associated with the United States should be excluded from the subset. In another example, when a user is viewing a video under an educational context (e.g., an educational video while in an educational setting), a sharing link to an educational sharing source that facilitates intellectual reflection on the video may be more appropriate than a sharing link to a social media sharing source that promotes gossiping about funny videos. Accordingly, based on the user/device context, selection component 108 can determine or infer that the sharing link associated with the educational sharing source should be included in the subset and the sharing link associated with the social media sharing source should be excluded from the subset.

In yet another aspect, selection component 108 can determine or infer the subset of links to display with the video based on factors associated with a user of the device from which the request to play the video is generated. These factors can include but are not limited to: a preference of the user, a demographic of the user, a language of the user, a location of the user or geo-location claimed as the user's home location (e.g., a country and/or a state the user is affiliated with), a context of the user, sharing history of the user, and/or social network affiliations of the user. For example, selection component 108 can identify social network links that are tailored to a particular geo-location the user is affiliated with (e.g., country) and include sharing links for these social networks within the subset as opposed to sharing links for social networks that are tailored to a different geo-location. In another example, selection component 108 can analyze a user's sharing history to determine which sharing sources 114 the user regularly shares or posts links to videos provided by media provider 102. The selection component 108 can then include sharing links for these sharing sources within the subset.

In yet another example, selection component 108 can examine an SNP link in view of a user's prior interaction with the social network profile page represented by the link. For instance, selection component 108 can analyze an SNP link that links to a particular social network profile page in view of a user's prior interaction with the social network profile page. If the user has previously viewed the page, selection component 108 can determine or infer that the link should not be displayed with the video (assuming the intent of the link to bring the user to the social network page has already been satisfied). Selection component 108 can further analyze a type of interaction with the social network page when determining or inferring whether to include the SNP link. For example, selection component 108 can determine or infer whether to include the SNP link based on whether the user has previously "liked," "disliked," or "joined/followed" the page. Selection component 108 can apply similar analysis with respect to external information source links.

Still in other aspects, selection component 108 can determine or infer the subset of links to display with the video based on other factors including but not limited to: trending links, time of year, time of day, holidays, government mandated links (e.g., Amber Alerts™, severe weather alerts, etc.) a premium paid by a video provider to guarantee inclusion of the link, quality of the link, content associated with the link (e.g., to effectuate the promotion of inoffensive content), etc. For example, around popular holidays such as Christmas or Hanukah, selection component 108 can promote the display (e.g., via inclusion in the subset of links for display with the video) of sharing links to network sites that organize and compile gift wish lists. It should be appreciated that the above noted factors or conditions that effect which links the selection component 108 will include in a subset of links to display with a video are merely exemplary and are not intended to limit the scope of the subject disclosure.

After a subset of links for displaying with a video is identified by selection component 108 and the manner/arrangement in which elements representative of the links will be displayed has been determined (e.g., by integration component discussed supra), the video can be presented to the user with the links displayed accordingly. For example, the client device 120 can include a presentation component 122 to present the video in a video player displayed in a user interface generated at the client device 120. The presentation component 122 can further overlay clickable graphical elements representative of the links included in the subset over the video image data displayed within the video player as it presented to the user via the user interface. The graphical elements can further be selected to effectuate opening of the links respectively represented by the graphical elements in a new window.

FIGS. 2-5B presents example users interfaces displaying videos having with links integrated therein or thereon in accordance with various aspects and embodiments described herein. Repetitive description of like elements employed in respective embodiments of systems and methods described herein are omitted for sake of brevity.

Figure 2:
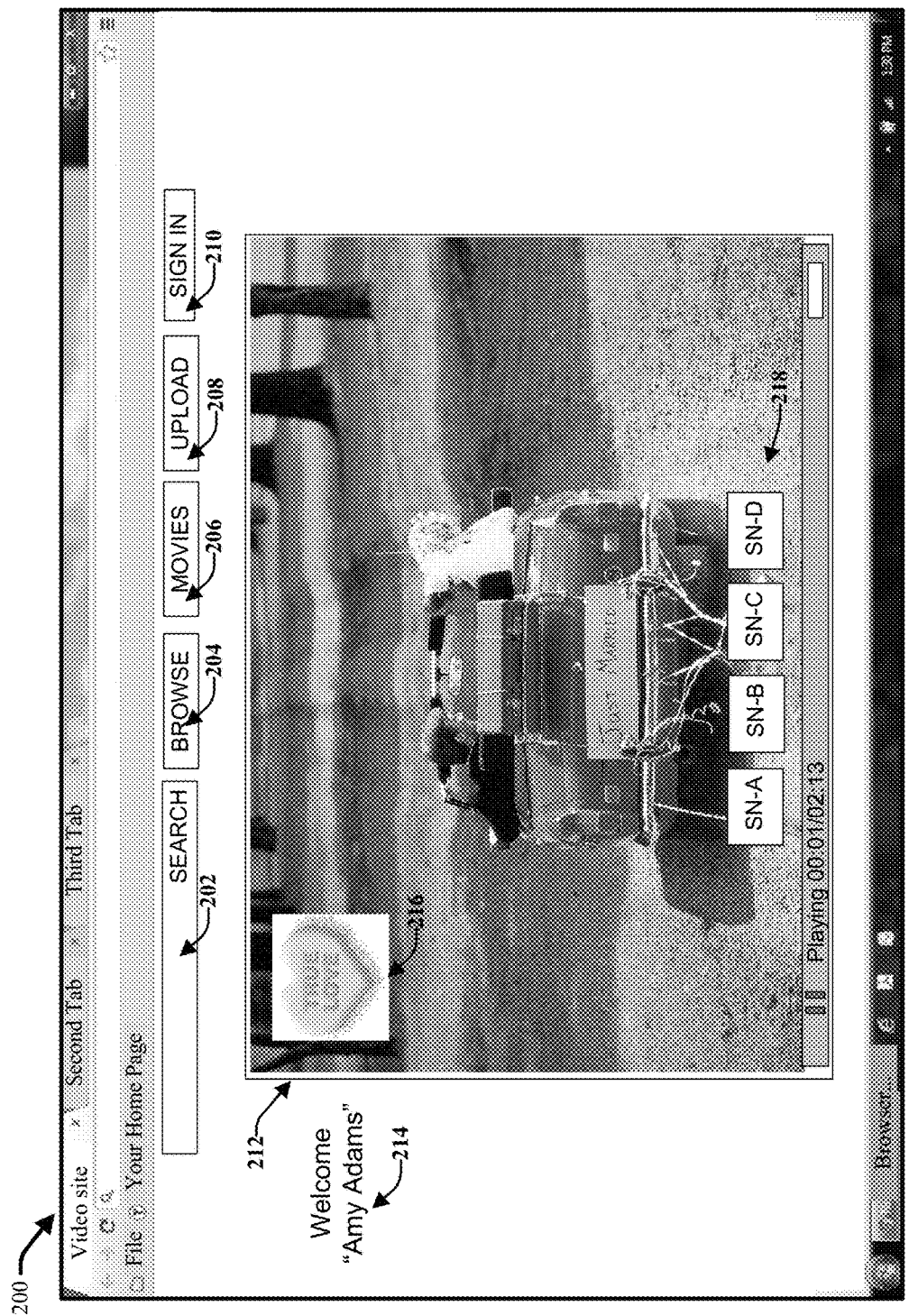
FIG. 2 presents an example user interface displaying a video with overlaid links that are selected based in part on various factors associated with a user of the device at which the video is displayed, in accordance with various aspects and embodiments described herein.

FIG. 2 presents an example interface 200 displaying a video 212 on a user device employed by user Amy Adams. In an aspect, the user device is a standard sized laptop PC with a standard sized display screen. The video 212 is displayed on a webpage associated with a video sharing website accessed by Amy using a browser of her laptop PC. For example, the video sharing website can include a website that allows multiple users to access and view streaming videos. In an aspect, the video sharing website employs a dynamic link integration platform (e.g., dynamic link integration platform 104 and the like) to facilitate dynamically integrating links with videos provided by the video sharing website.

Interface 200 displays webpage associated with the video sharing website configured to display videos. In an aspect, the webpage can include a search toolbar 202 that allows users to search for videos, a browse toolbar that allows users to browse for videos, a movies toolbar that allows users to search for movies and a sign in toolbar that allows users to sign into an account they created for maintaining a personalized user experience with the video sharing website. In an aspect, user Amy Adams has is recognized (as indicated by arrow 214) by the video sharing website, for example in response to establishment of a use account and signing in.

A video 212 is being played in interface 200 with links 216 and 218 that have been dynamically selected by the dynamic link generation platform based at least in part on the user being Amy Adams and various features associated with Amy Adams, such as her sharing history, her preferences, her age, her gender etc. In an aspect, the video 212 is a video selected by Amy Adams for playing. In another aspect, the video 212 is a video advertisement that is displayed as a pre-roll advertisement prior to the playing of another video selected by Amy. For example, video 212 can be an advertisement for a dating/matchmaking service. In an aspect, link 216 is an external information source link to a webpage affiliated with the dating/matchmaking service that was pre-associated with the video 212 when the video was provided to the video sharing website. Links 218 can include sharing links for various social networks. These sharing links can be links generated and stored by the video sharing website. Sharing links 218 are depicted as simple boxes with text therein denoting social network (SN) A, NB B, SN C, and so on merely for exemplary purposes. It should be appreciated that other pictorial images or icons can be employed as elements to represent the sharing links 218.

Figure 3:
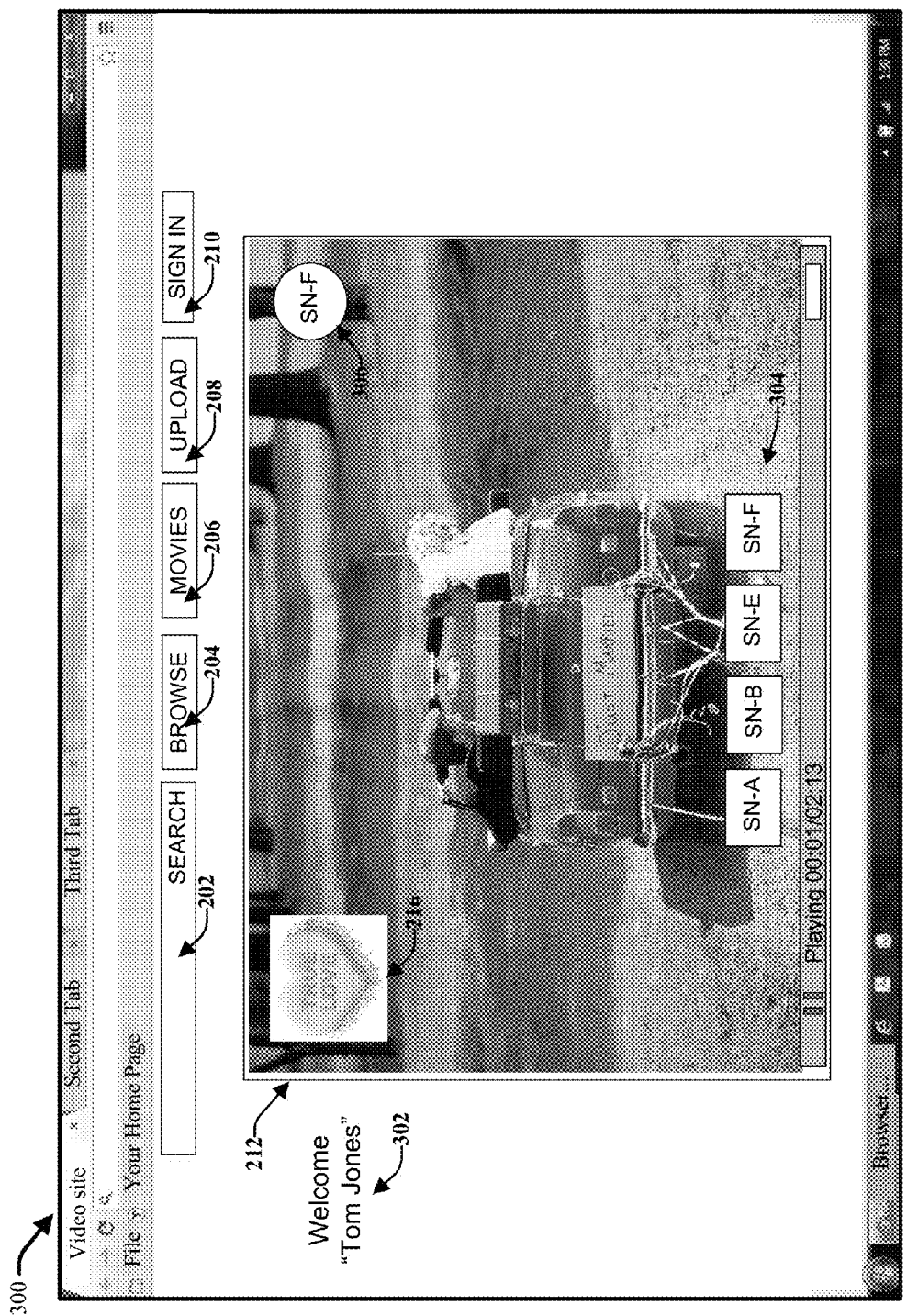
FIG. 3 presents another example user interface displaying a video with overlaid links that are selected based in part on various factors associated with a user of the device at which the video is displayed, in accordance with various aspects and embodiments described herein.

FIG. 3 presents another example interface 300 associated with the video sharing website discussed with respect to FIG. 2. Similar to interface 200, interface 300 displays video 212. Interface 300 is also displayed on a standard laptop PC having a standard sized display screen. However, interface 300 is presented to user Tom Jones as opposed to user Amy Adams. According to this example, video 212 is being played in interface 300 with links 216, 304 and 306 overlaid thereon, that have been dynamically selected by the dynamic link generation platform based at least in part on the user being Tom Jones and various features associated with Tom Jones, such as his sharing history, his preferences, his age, his gender etc. As seen by comparing interfaces 200 and 300, the links presented to Amy Adams are different than the links presented to Tom Jones, despite the fact that both users are viewing the same video on same or similar devices. In particular, interface 300 replaces SN C and SN D with SN E and SN F.

Interface 300 also includes another link 306 having a different appearance and location than the sharing links 304. According to this example, link 306 is a SNP link for a social network profile page of the dating/matchmaking services at social network F. In an aspect, dynamic link integration platform is facilitates placement of SNP link 306 and sharing link SN-F at different locations of the video display to distinguish the two links. In another aspect, dynamic link integration platform is changes the appearance of the elements that represent SNP link 306 and sharing link SN-F to distinguish the two links given their affiliation with the same social network, social network F. For example, sharing link 304 for SN-F is depicted as a square while SNP link 306 for social network F is depicted as a circle.

Figure 4:
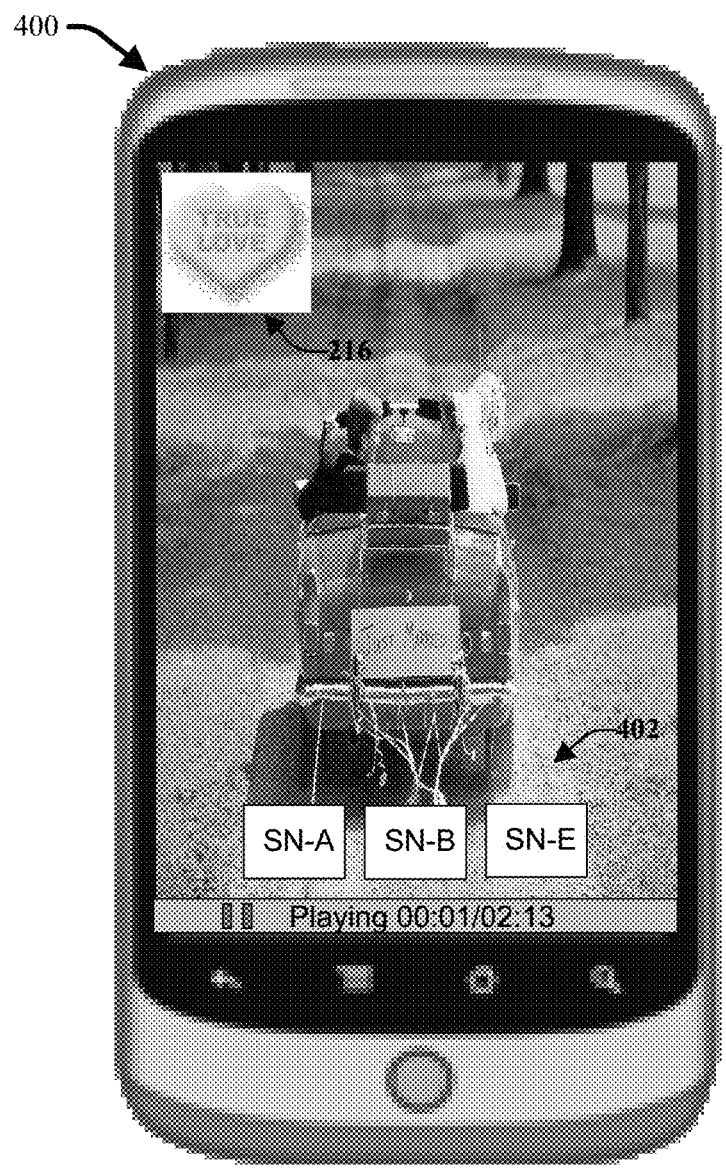
FIG. 4 presents an example user interface displaying a video with overlaid links that are selected video based in part on various factors associated with a user of the device at which the video is displayed and dimensions of a display screen of the device, in accordance with various aspects and embodiments described herein.

FIG. 4 presents an example interface 400 of the video sharing website discussed with respect to FIGS. 2 and 3. Similar to interfaces 200 and 300, interface 400 displays video 212. Similar to interface 300, interface 400 is displayed to user Tom Jones. However, unlike interfaces 200 and 300, interface 400 is displayed on a smartphone device having a much smaller display screen than the display screen associated with Tom's laptop PC. According to this example, video 212 is being played in interface 300 with links 216 and 402 overlaid thereon, that have been dynamically selected by the dynamic link generation platform based at least in part on the user being Tom Jones and the dimensions of the display screen of Tom's smartphone. For example, when comparing interface 400 with interface 300, it can be seen that sharing link SN-F and SNP link 306 have been removed from interface 400 to reduce cluttering of the small display screen with too many links.

Figure 5B:
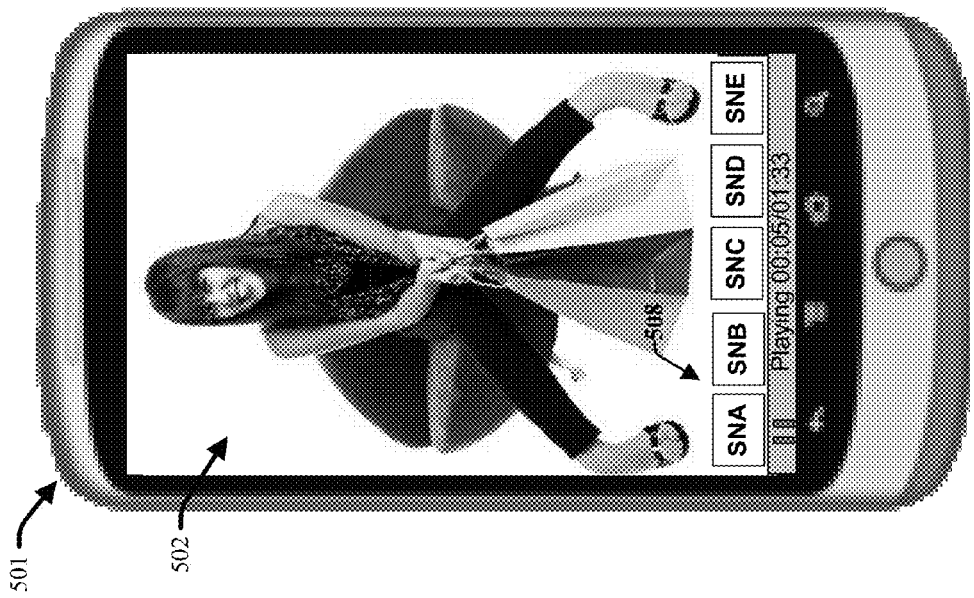
FIGS. 5A and 5B present an example user interface displaying a video with overlaid links that are selected video based in part on various factors associated with a user of the device at which the video is displayed and dimensions of a display screen of the device, in accordance with various aspects and embodiments described herein.
Figure 5A:
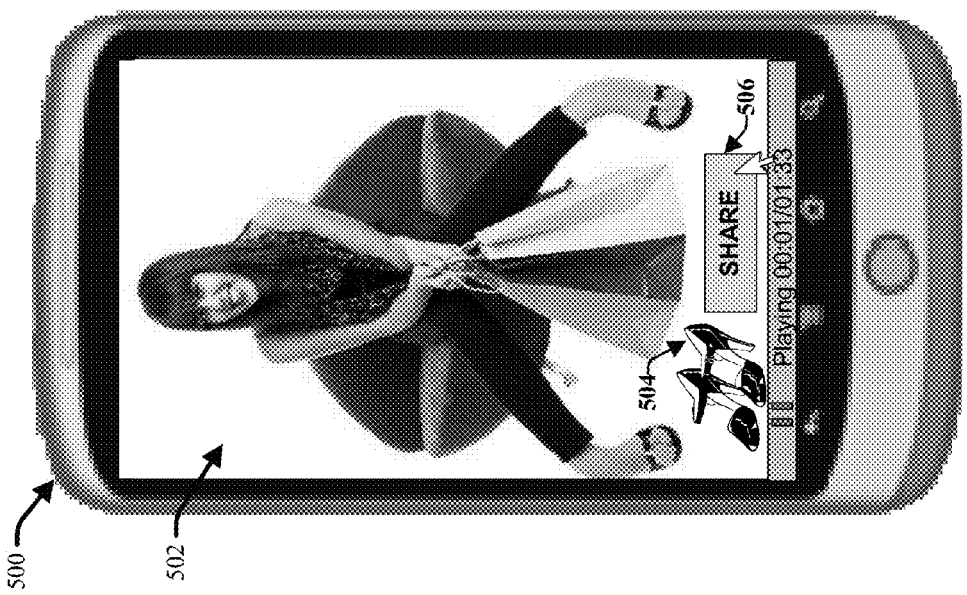

FIGS. 5A and 5B presents other example interfaces 500 and 501 of the video sharing website discussed with respect to FIG. 2, as displayed on a mobile phone. Interfaces 500 and 501 display a different video 502 that is a video advertisement for a shoe store company Fancy Feet Inc that sells woman's shoes. FIG. 5A displays a first version of a user interface 500 that is initially displayed to the user of the mobile phone upon playing of the video advertisement. The initial interface 500 includes an external information source link 504 that links to a website for Fancy Feet Inc., and an omnibus share link 506. In an aspect, selection of the share link 506 in interface 500 can result in the display of interface 501. Interface 501 replaces links 504 and 506 with a plurality of sharing links 508 for various sharing sources (e.g., social network (SN) A, SN B, SN C, etc.).

In an aspect, dynamic link integration platform 104 is configured to utilize interfaces 500 and 501 (and the like) to facilitate displaying multiple sharing links over a video displayed on a relatively small display screen. In particular, by grouping the social sharing links 508 together under an omnibus share link 506, dynamic link generation platform can present a user with a plurality of sharing links that would not otherwise fit within the dimensions of the display screen in addition to external information source link 504.

Figure 6:
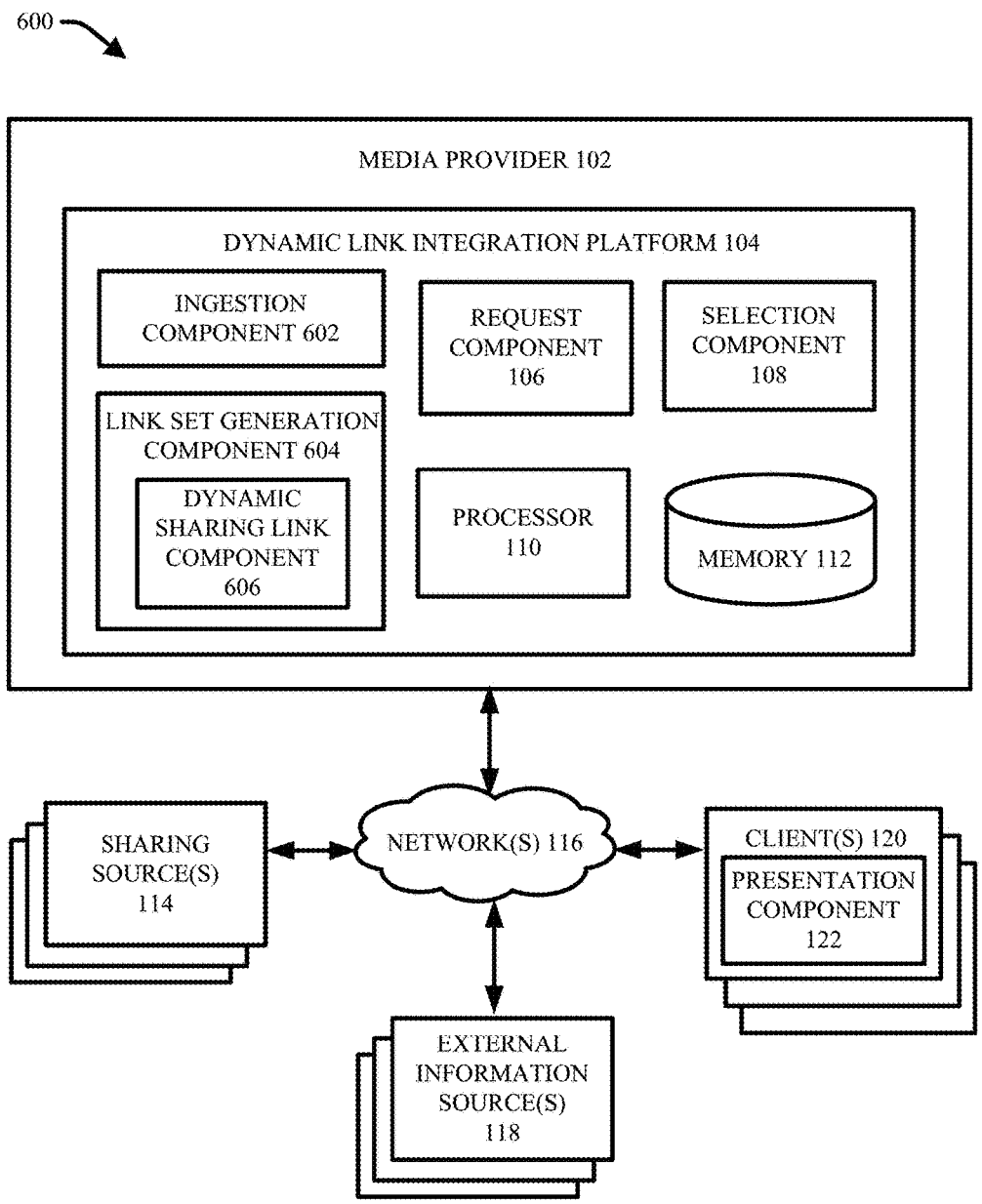
FIG. 6 illustrates another example system for dynamically displaying hyperlinks in a video based on various factors associated with a device at which the video is played and a user of the device, in accordance with various aspects and embodiments described herein.

FIG. 6 presents another example system 600 that facilitates dynamically selecting and displaying hyperlinks in a video based on various factors associated with a device at which the video is played and a user of the device, in accordance with various aspects and embodiments described herein. System 600 includes same or similar features and functionalities of system 100 with the addition of link ingestion component 602 and link set generation component 604. Repetitive description of like elements employed in respective embodiments of systems and methods described herein are omitted for sake of brevity.

Link ingestion component 602 is configured to ingest and process links pre-associated for display with a video that has been received by media provider 102. In an aspect, link ingestion component 602 is configured to analyze metadata associated with videos uploaded to media provider 102 and identify links included therein. Link ingestion component 602 can also process links identified in metadata associated with videos uploaded to media provided to classify the respective links as sharing links, SNP links, and/or external information source links. Link ingestion component 602 can further associate the classified links with IDs for the respective video in a database that can be stored in memory 112. In another aspect, links pre-associated with videos received by media provider 102 can be ingested by link ingestion component 602 and manually identified, classified and programmed into a database keyed by video ID.

Link set generation component 604 is configured to generate a set of links associated with a video from which selection component 108 can identify a subset of links from for displaying with the video in response to and based on a particular request to play the video. In an aspect, in response to a request for a video, link set generation component 604 can generate a set of links associated with a video that includes all pre-associated links for the video (e.g., as identified using a database populated by link ingestion component 602) and all media provider generated links associated with media provider 102 (e.g., that are stored in memory 112). Selection component 108 can then select a subset of links from this set of links for display with the video based on the various factors and conditions discussed supra (e.g., device software and hardware capabilities, device context, user preferences, user sharing history, user demographics, etc.).

In another embodiment, link set generation component 604 is configured to generate a set of links that has been filtered in part to include a subset of media provider sharing links considered relevant by dynamic link integration platform and to eliminate pre-associated links that a duplicates or substantial duplicates of media provider links. Selection component 108 can then select a subset of links from this partially filtered set of links for display with the video based on one or more of the various factors and conditions discussed supra (e.g., device software and hardware capabilities, device context, user preferences, user sharing history, user demographics, etc.). According to this embodiment, rather than retrieving and caching data associated with all media provider generated links prior to selection of a subset of links for displaying with a video, dynamic link integration platform can retrieve and cache information for a smaller subset of media provider generated links that are relevant to a current video request.

As noted supra, sharing links that are generated by media provider (as opposed to sharing links that are pre-associated with a video) are specifically configured to facilitate sharing a link to a video provided by media provider 102 and/or embedding a video provided by media provider 102. For example, media provider generated sharing links can include sharing links that facilitate sharing a video (e.g. a link to the video or embedding the video) at a sharing source 114 associated with a user desiring to share the video (e.g., a social network profile account for the user). Media provider generated sharing links can also include links that facilitate sharing a link to a video provided by media provider via an electronic message.

When a sharing link is displayed with a video, selection of the sharing link by the viewing user can result in sharing of a link to the video or embedding the video. For example, selection of a sharing link overlaid onto a video can result in the generation of a URL for the video and/or embed code for the video which a user can manually select for integration at a sharing source or electronic message. In another example, as discussed supra, selection of a sharing link overlaid onto a video that represents a particular sharing source 114 (e.g., a particular social network) can result in the automatic integration of a link to the video and or an embedded player configured to play the video, at a profile page of the user who selects the sharing link at the particular sharing source.

However, sharing links generated by media provider 102 can differ from sharing links that are pre-associated with a video (e.g., by a creator or uploader of the video) based on configuration of the link to a video that is shared/posted in response to selection of the sharing link displayed with the video, and/or based on the configuration of the embedded video player configured to play the video that is shared/posted in response to selection of the sharing link displayed with the video. In particular, media provider generated sharing links are configured to generate links to videos and/or embed videos that are configured by media provider 102 and represent version of the videos provided by media provider 102.

For example, in response to selection of a media provider generated sharing link displayed with a video, a link to the video can be generated by media provider and/or posted at a sharing source 114 represented by the media provider generated sharing link (e.g., a social network profile page of the sharing user). This link will have a URL configured by media provider 102 for the video at a webpage hosed by media provider 102 (as opposed to a URL for the video at a webpage hosted by another network entity). In another example, in response to selection of a media provider generated sharing link displayed with a video, an embedded player configured to play the video can posted at a sharing source 114 represented by the media provider generated sharing link (e.g., a social network profile page of the sharing user). This embedded player will be an embedded player selected and formatted by media provider and configured to play the video as streamed from media provider 102. Therefore, media provider generated sharing links are preferred over pre-associated sharing links that may or may not be configured in accordance with parameters desired by media provider 102.

In an aspect of this embodiment, link set generation component 604 can include dynamic sharing link component 606. Dynamic sharing link component 606 is configured to generate a subset of media provider generated sharing links. In particular, dynamic sharing link component 606 can examine media provider generated sharing links stored in memory 112 and generate a subset of these media provider generated sharing links in response to a request to play a video. Dynamic sharing link component 606 can employ same or similar factors/conditions employed by selection component 108 for selecting a subset of links to display with a video when identifying a subset of media provider generated sharing links that are suitable for displaying with the video.

For example, in response to a request to play a video, dynamic sharing link component 606 can identify a subset of media provider generated sharing links from a set of media provider generated sharing links (e.g., stored in memory 112) that are suitable for display with the video based in part on various factors associated with a user associated with the request, including but not limited to: user preferences, user demographics, user sharing history, user geo-location affiliation, user language, user context, user social network affiliations, sharing sources the user has followed links to videos provided by media provider, and/or sharing sources at which the user has viewed embedded videos provided by media provider. In another example, in response to a request to play a video, dynamic sharing link component 606 can identify a subset of media provider generated sharing links from a set of media provider generated sharing links (e.g., stored in memory 112) that are suitable for display with the video based in part on various factors associated with a device at which the video will be played, including but not limited to: device operating capabilities, device display screen dimensions, device operating system, applications provided on the device, a location of the device, or a context of the device.

In an aspect, in association with generation of the subset of media provider generated links that are suitable for displaying with a requested video based on one or more of the various conditions/factors exemplified above, dynamic sharing link component 606 can rank the links included in the subset to reflect a priority order for integration of the respective links with the video. For example, dynamic sharing link component 606 can rank respective links included in the subset to reflect degree to which the respective links are suitable for displaying with the requested video. In an aspect, the ranking can reflect an inferred likelihood that the link will be selected by the viewing user. For example, a sharing link that represents a social networking source that the viewing user regularly shares links to videos at can receive a high ranking than a sharing link that represents a social networking source that the viewing user has never visited.

Figure 7:
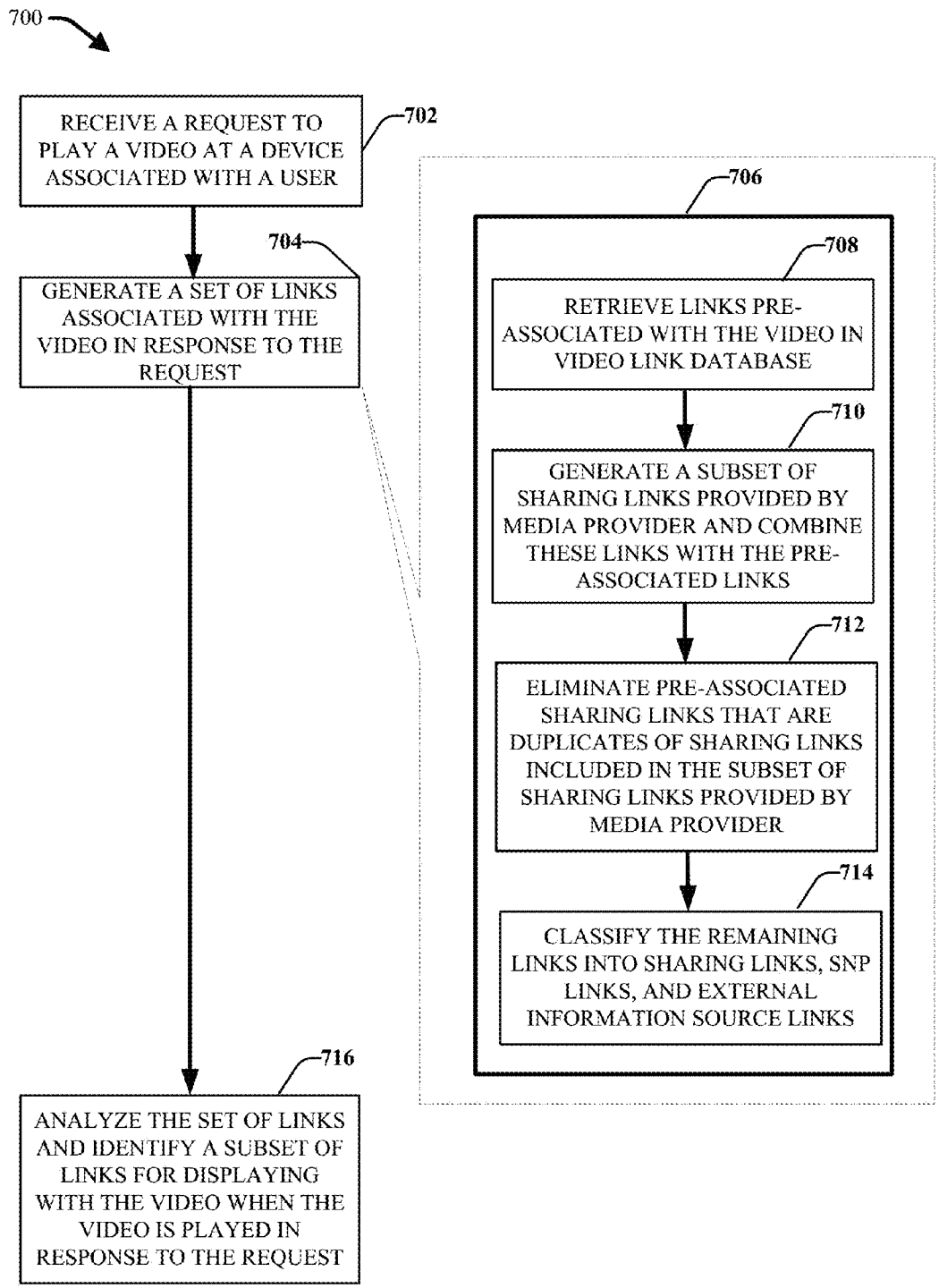
FIG. 7 is a flow diagram of another example method for generating a set of links associated with a video in response to a request to play the video, in accordance with various aspects and embodiments described herein.

FIG. 7 presents a flow diagram that outlines an example process 700 for dynamically selecting links for displaying with a video that includes a process for generating of a set of links associated with the video by link set generation component 604 and dynamic sharing link component 606. Process 700 initially begins with reception of a request to play a video at 702. For example, this request can include selection of a video for playing by a user at his client device. In another example, this request can include a request initiated by a media provider providing the video to automatically initiate playing of the video in response to the occurrence of a predetermined condition (e.g., a video player coming into view or the opening of a new browser window that presents a video).

In response to reception of the request by dynamic link integration platform 104, link set generation component 604 can generate a set of links associated with the video at 704. Call out box 706 presents an example process for generating this set of links by link set generation component 604. At 708, link set generation component 604 can fetch links pre-associated with the video. For example, link set generation component 604 can identify links pre-associated with the video that have been keyed to an ID for the video in a video link database that was previously generated prior to the request and stored in memory accessible to link set generation component 604. At 710, as link set generation component is fetching pre-associated links, dynamic sharing link component 606 can procedurally generate a subset of media provider generated sharing links and combine these links with the pre-associated links.

For example, dynamic sharing link component 606 can analyze a plurality of sharing links stored by dynamic link integration platform 104 that were generated by media provider 102 and/or dynamic link generation platform prior to the request. Based on the analysis, dynamic sharing link component 606 can generate a subset of media provider generated sharing links that are most likely to be selected by the user, are most relevant to the user, and/or are suitable for displaying at the user's client device based on various restrictions of the client device (e.g., display screen size, operating parameters, applications provided on the device, etc.). In an aspect, dynamic sharing link component 606 can rank then sharing links included in the subset based on degree of likelihood the user will select the respective sharing links.

At 712, link set generation component 604 can eliminate pre-associated sharing links that are duplicates of sharing links included in the dynamically generated subset of sharing links provided by media provider. For example, link set generation component 604 can comb over the pre-associated links to identify URLs that are the same or substantially the same as URLs included in the subset of sharing links provided by media provider and eliminate these pre-associated URLs. In an aspect, link generation component identifies duplicate URL using regular expressions since the URLs might not be exact duplicates. Then at 714, link set generation component 604 can classify the remaining links as sharing links, SNP links, and external information source links. After the set of links has been generated by link set generation component 604, selection component 108 identifies a subset of links included in the set for displaying with the video (e.g., as overlaid onto image data of the video and/or integrated with image data of the video) when the video is played based on one or more of the various conditions/parameters discussed herein. For example, selection component 108 can select which links will ultimately be displayed with the video based on factors related to the device at which the video will be played (e.g., device display screen dimensions, device operating parameters, applications provided on the device etc.), factors associated with the viewing user (e.g., user preferences, user sharing history, user geo-location, user demographics etc.), and/or other factors discussed herein.

For example, selection component 108 can first examine the number of links included in the subset and determine a cutoff point. In one aspect, the minimum cut off point can be equal to the number of pre-associated links for the video. In another aspect, the cutoff point can be an arbitrary number. In yet another aspect, selection component 108 can determine the cutoff point by taking the number of pre-associated links and adding to it the number of sharing links associated with a ranking above a predetermined threshold that reflects a high probability of sharing by the user.

Next, selection component 108 can analyze display screen size associated with the client device at which the video will be displayed. For instance, on some devices (e.g., a mobile device) the video will be are rendered in a smaller size as compared to a larger device (e.g. a PC). As a result the amount of space available on the display screen plays an important role in deciding how many and which links to include in the subset. In an aspect, selection component 108 can analyze the dimensions of video, the manner in which the links will be displayed (e.g., horizontally and/or vertically), the dimensions of the elements representative of the links included in the set, and the spacing between the links. Based on this analysis, selection component 108 can select a subset of links for displaying with the video that falls within the cutoff point.

Figure 8:
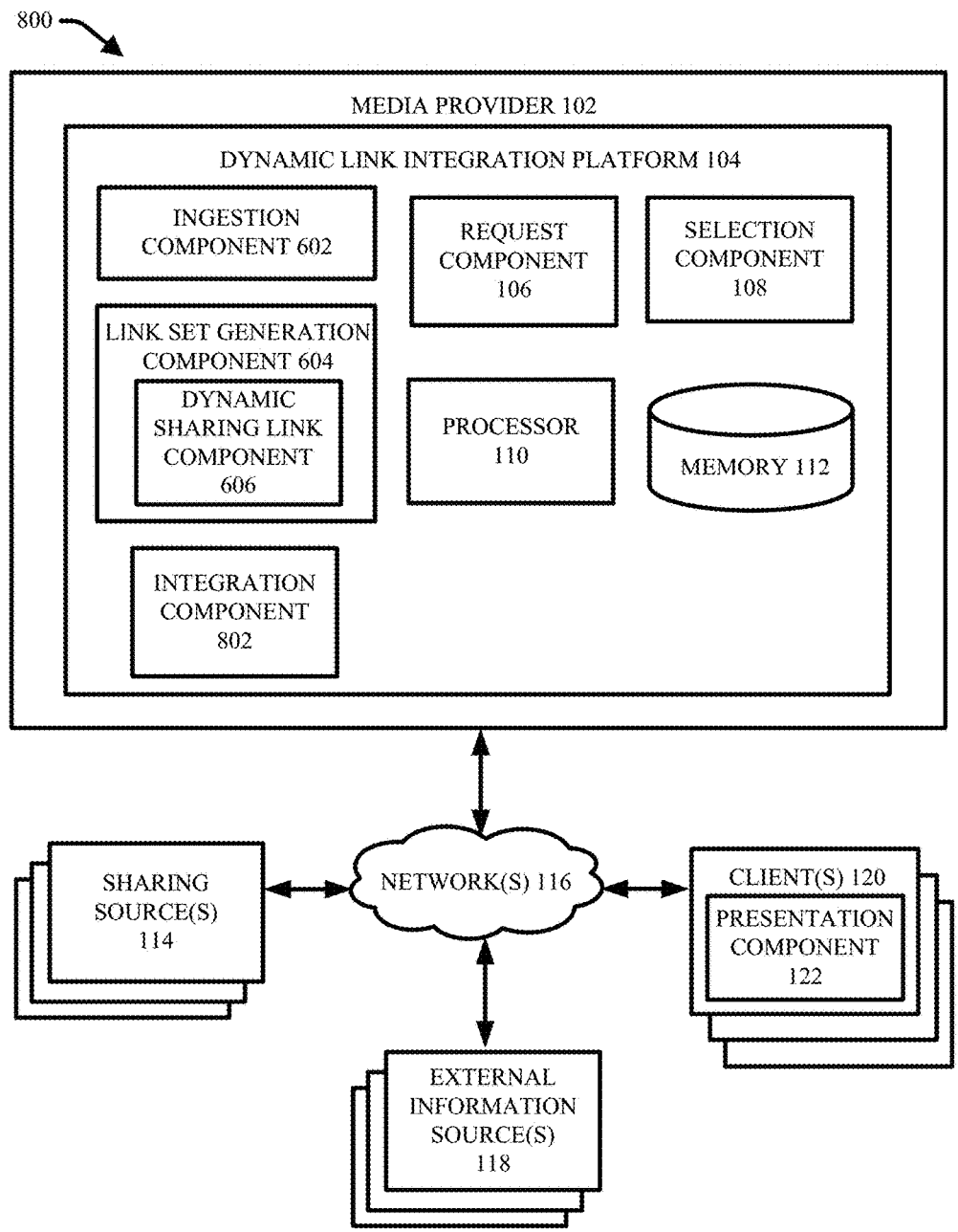
FIG. 8 illustrates another example system for dynamically displaying hyperlinks in a video based on various factors associated with a device at which the video is played and a user of the device, in accordance with various aspects and embodiments described herein.

FIG. 8 presents another example system 800 that facilitates dynamically displaying hyperlinks in a video based on various factors associated with a device at which the video is played and a user of the device, in accordance with various aspects and embodiments described herein. System 800 includes same or similar features and functionalities of system 600 with the addition of integration component 802. Repetitive description of like elements employed in respective embodiments of systems and methods described herein are omitted for sake of brevity.

Integration component 802 is configured to determine how to display a subset of links selected for display with a video. In particular, integration component is configured to determine an arrangement for displaying the elements representative of the links of the subset as overlays on the video when it is played. For example, integration component 802 can analyze dimensions of a display screen at which the video is played and dimensions of elements representative the links in the subset to determine how to arrange the links on the display screen. In an aspect, integration component 802 facilitates selection component 108 with determining or inferring which links to select. For example, integration component can analyze size and shape of elements and determine which elements or combination of elements will fit within the video display area and how they will fit. This analysis by integration component 802 can influence which links selection component 108 selects for inclusion in the subset.

In an aspect, integration component 802 is configured to arrange the different types of links, including sharing links, SNP links and external information source links, at different locations of the displayed video. For example, integration component 802 can be configured to display sharing links in a horizontal manner and SNP links in a vertical manner, and vice versa, to distinguish between the different types of links. In another example, integration component 802 can group sharing links under an omnibus clickable share icon as described with respect to FIGS. 5A and 5B based in part on device display screen size and/or device operating parameters.

Figure 9:
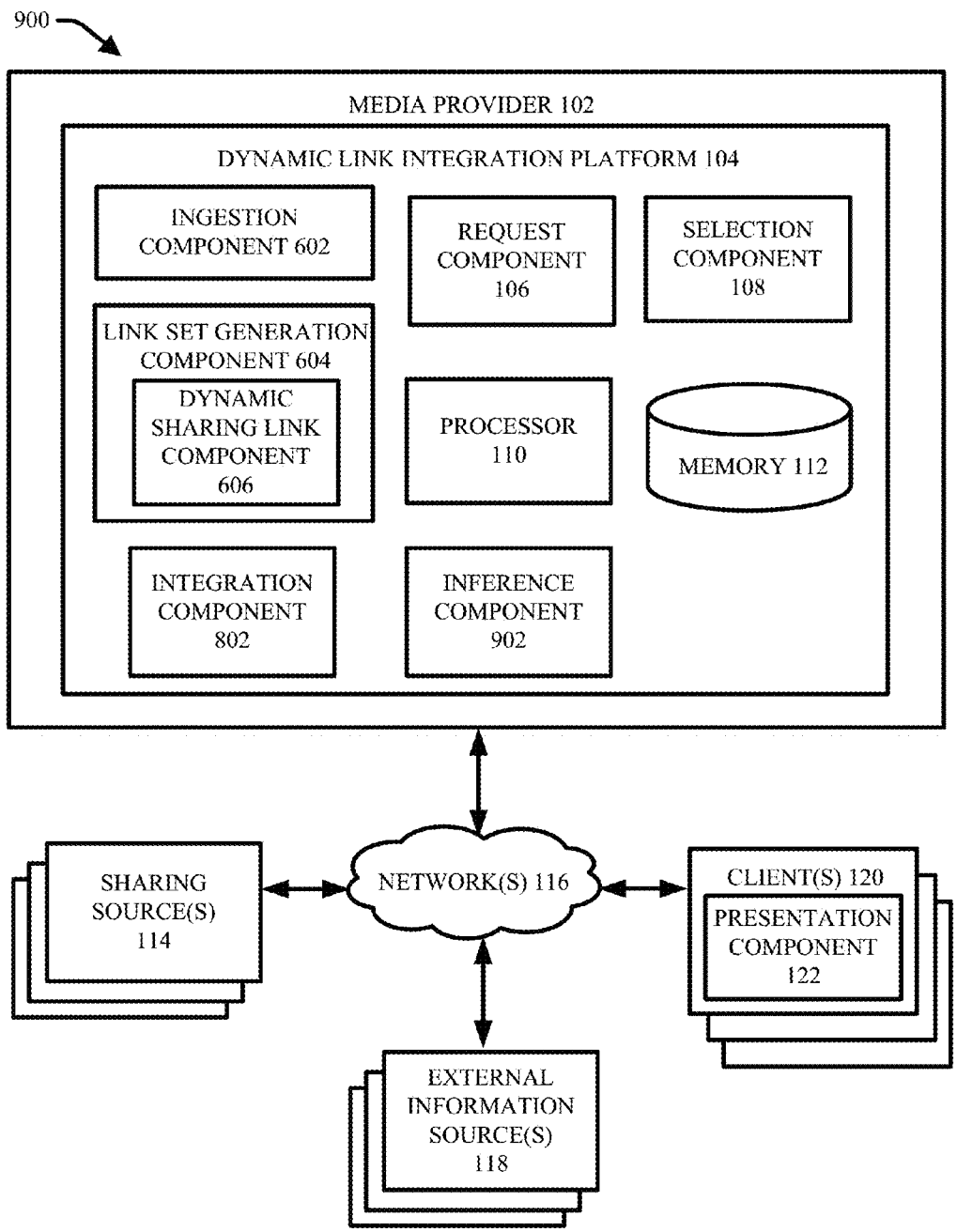
FIG. 9 illustrates another example system for dynamically displaying hyperlinks in a video based on various factors associated with a device at which the video is played and a user of the device, in accordance with various aspects and embodiments described herein.

FIG. 9 presents another example system 900 that facilitates dynamically displaying hyperlinks in a video based on various factors associated with a device at which the video is played and a user of the device, in accordance with various aspects and embodiments described herein. System 900 includes same or similar features and functionalities of system 800 with the addition of inference component 902. Repetitive description of like elements employed in respective embodiments of systems and methods described herein are omitted for sake of brevity.

Inference component 902 is configured to provide for or aid in various inferences or determinations associated with aspects of dynamic link integration platform 104, including selection component 108, link set generation component 604, dynamic sharing link component 606 and integration component 802. In aspect, all or portions of dynamic link integration platform can be operatively coupled to inference component 902. Moreover, inference component 902 can be granted access to all or portions of sharing sources 114, external information sources 118 and clients 120.

In an aspect, the inference component 902 can facilitate inferring a subset of links to display with a video and how to display those links with the video (e.g., how to arrange and size elements representative of those links as overlays on the video) based on the various conditional factors discussed herein (e.g., device operating parameters, device display screen size, size of graphical elements representative of links, device context, user preferences, user sharing history, user geolocation affiliation, etc.).

In order to provide for or aid in the numerous inferences described herein, inference component 902 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example.

The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 10:
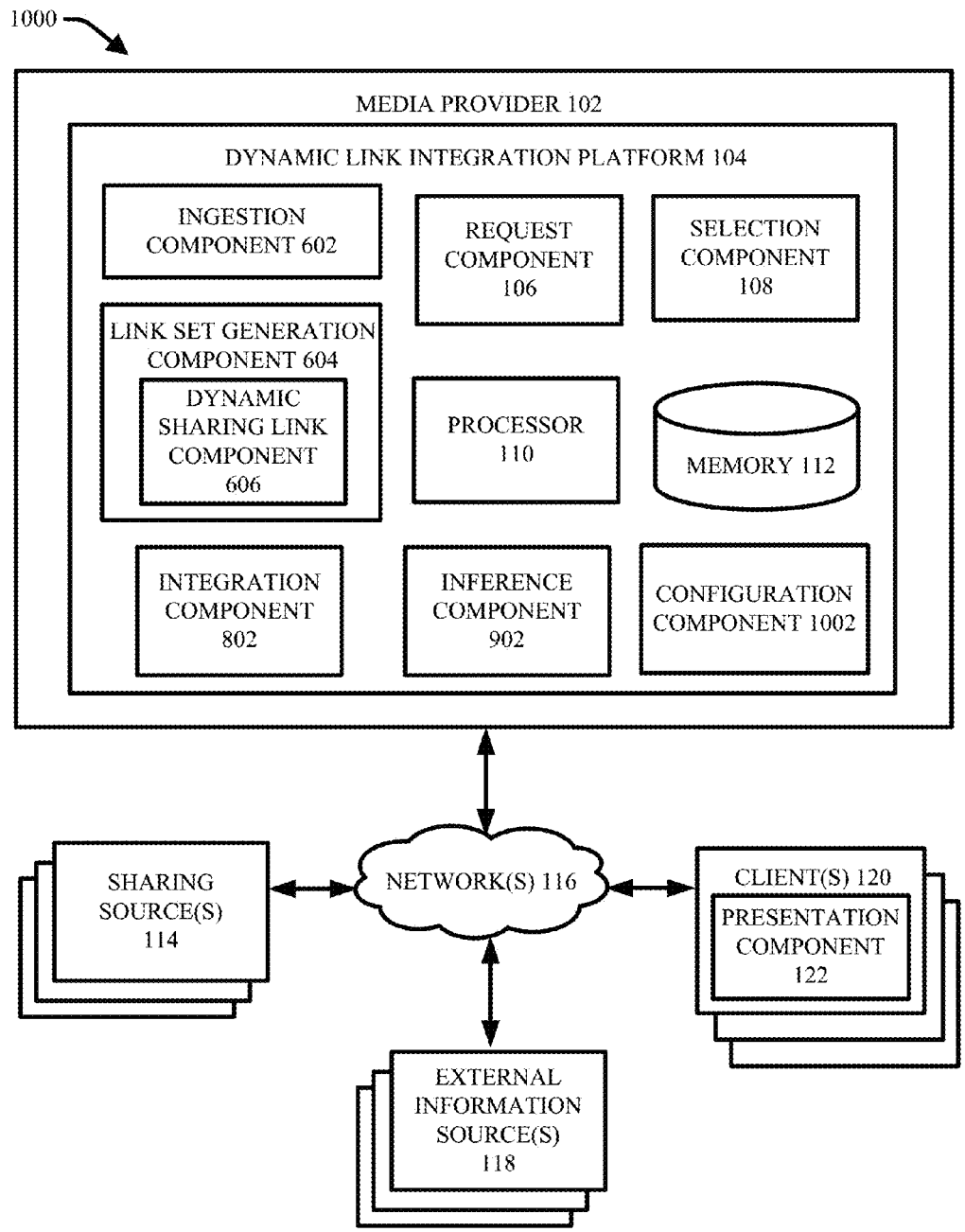
FIG. 10 illustrates another example system for dynamically displaying hyperlinks in a video based on various factors associated with a device at which the video is played and a user of the device, in accordance with various aspects and embodiments described herein.

FIG. 10 presents another example system 1000 that facilitates dynamically displaying hyperlinks in a video based on various factors associated with a device at which the video is played and a user of the device, in accordance with various aspects and embodiments described herein. System 1000 includes same or similar features and functionalities of system 900 with the addition of configuration component 1002. Repetitive description of like elements employed in respective embodiments of systems and methods described herein are omitted for sake of brevity.

Configuration component 1002 is configured to facilitate configuring links provided with videos displayed on mobile devices to account for operating systems employed by the respective mobile devices and/or applications provided on the respective mobile devices. In an aspect, when a video is selected for playing at a mobile device, configuration component 1002 is configured to identify and analyze applications provided on the mobile device. For example configuration component 1002 can receive information regarding particular application programs stored on the mobile device. Configuration can further provide this information to selection component 108 to facilitate selecting links to display with the video. For example, where a mobile device includes an application for social network "Keeping up with Friends," selection component 108 can infer that a sharing link for the social network "Keeping up with Friend" is appropriate for display with the video.

In addition, configuration component 1002 can further configure links to network sources for which a corresponding application is provided on the client device 120 at which the link will be displayed (e.g., in association with a requested video) so that selection of the link results in opening of the corresponding application at the client device 120 (e.g., as opposed to a URL for the web site associated with the link). In furtherance to the above example, configuration component 1002 can configure the sharing link for the social network "Keeping up with Friends" such that selection of the sharing link causes the Keeping up with Friend's application provided on the mobile device to open in response to selection of the link as opposed to a website for "Keeping up with Friends" or another URL.

Figure 11:
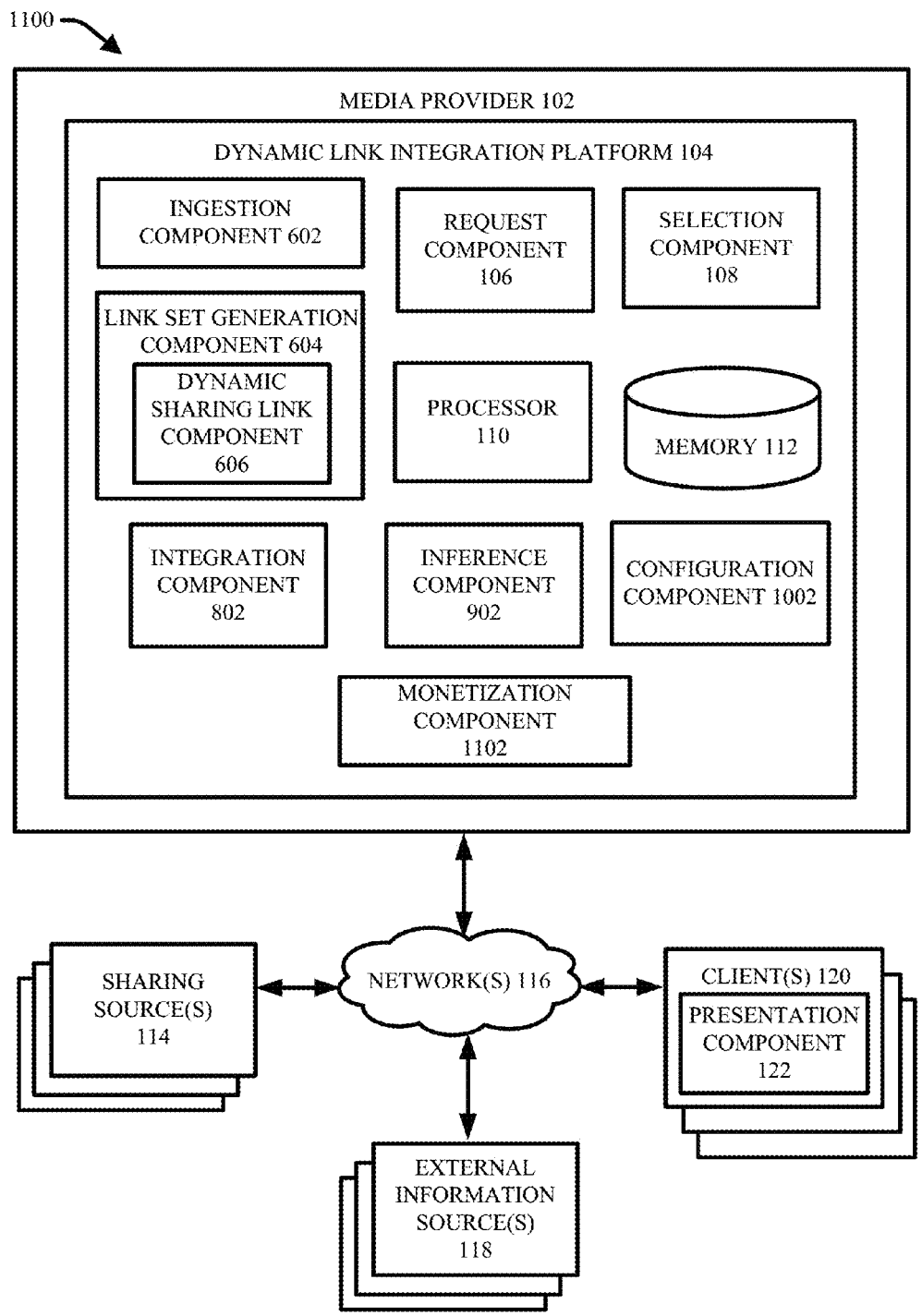
FIG. 11 illustrates another example system for dynamically displaying hyperlinks in a video based on various factors associated with a device at which the video is played and a user of the device, in accordance with various aspects and embodiments described herein.

FIG. 11 presents another example system 1100 that facilitates dynamically displaying hyperlinks in a video based on various factors associated with a device at which the video is played and a user of the device, in accordance with various aspects and embodiments described herein. System 1100 includes same or similar features and functionalities of system 1000 with the addition of monetization component 1102. Repetitive description of like elements employed in respective embodiments of systems and methods described herein are omitted for sake of brevity.

Monetization component 1102 is configured to implement a charging scheme that charges an advertiser based in part on selection of links displayed with a video advertisement of the advertiser. For example, monetization component 1102 can track each time a user selects a link displayed during a video advertisement. Monetization component 1102 can further track each time a link to the video advertisement is shared and each time other uses select the shared link at the sharing source at which it is shared. Monetization component can further charge the advertiser based on these tracked user interactions with links displayed with the video advertisement.

Figure 12:
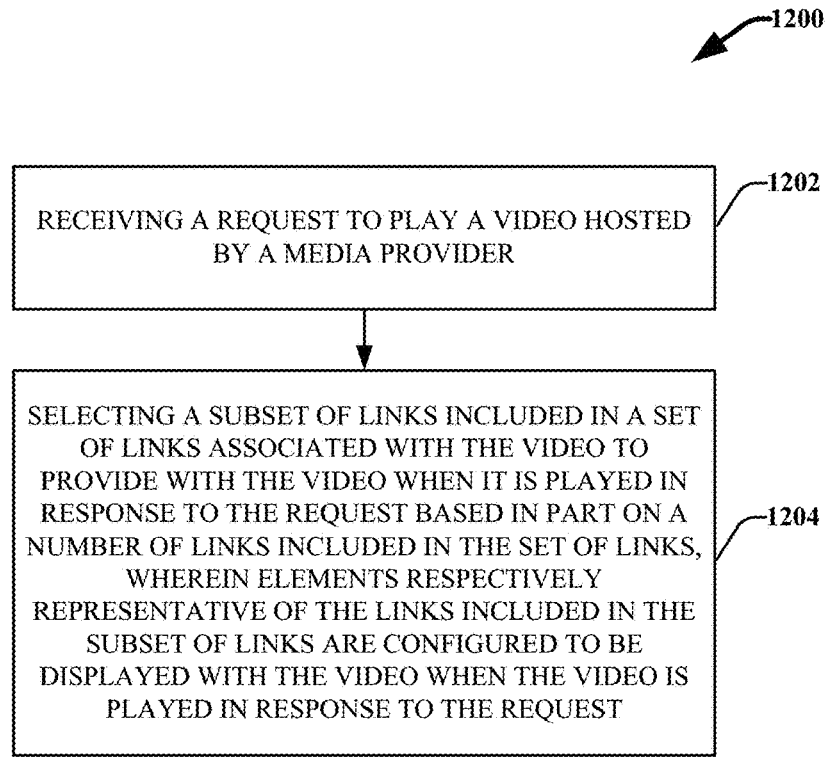
FIG. 12 presents a flow diagram of an example method for dynamically displaying hyperlinks in a video based on various factors associated with a device at which the video is played and a user of the device, in accordance with various aspects and embodiments described herein.
Figure 13:
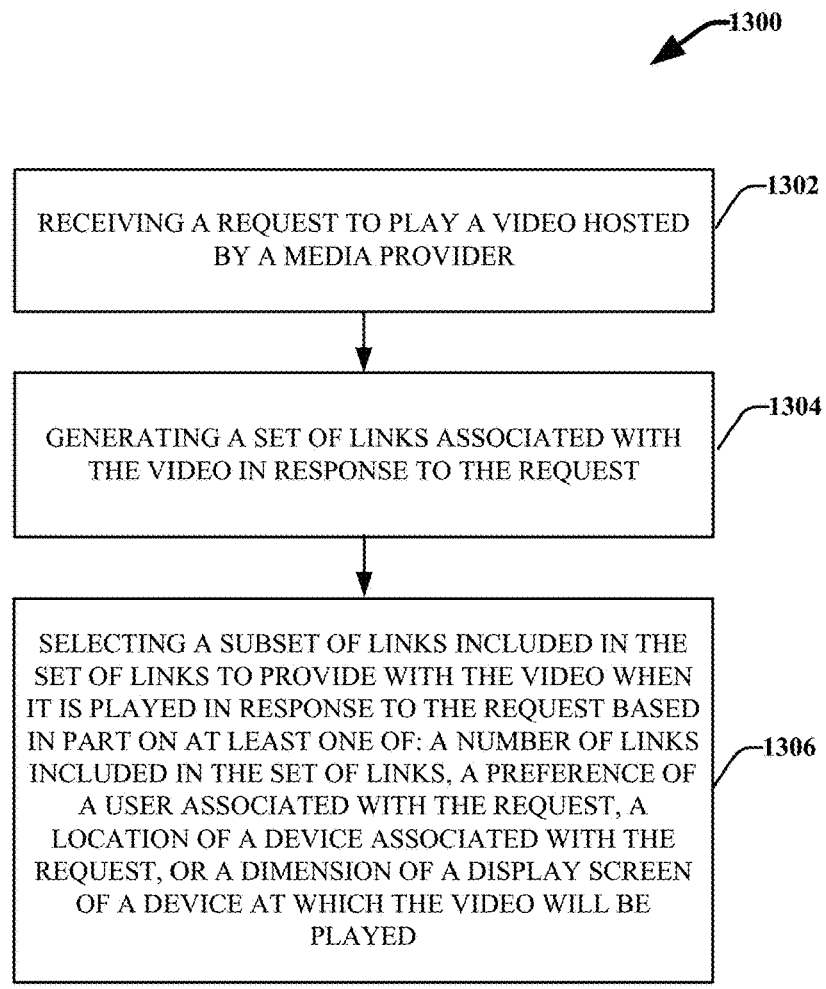
FIG. 13 presents a flow diagram of another example method for dynamically displaying hyperlinks in a video based on various factors associated with a device at which the video is played and a user of the device, in accordance with various aspects and embodiments described herein.
Figure 14:
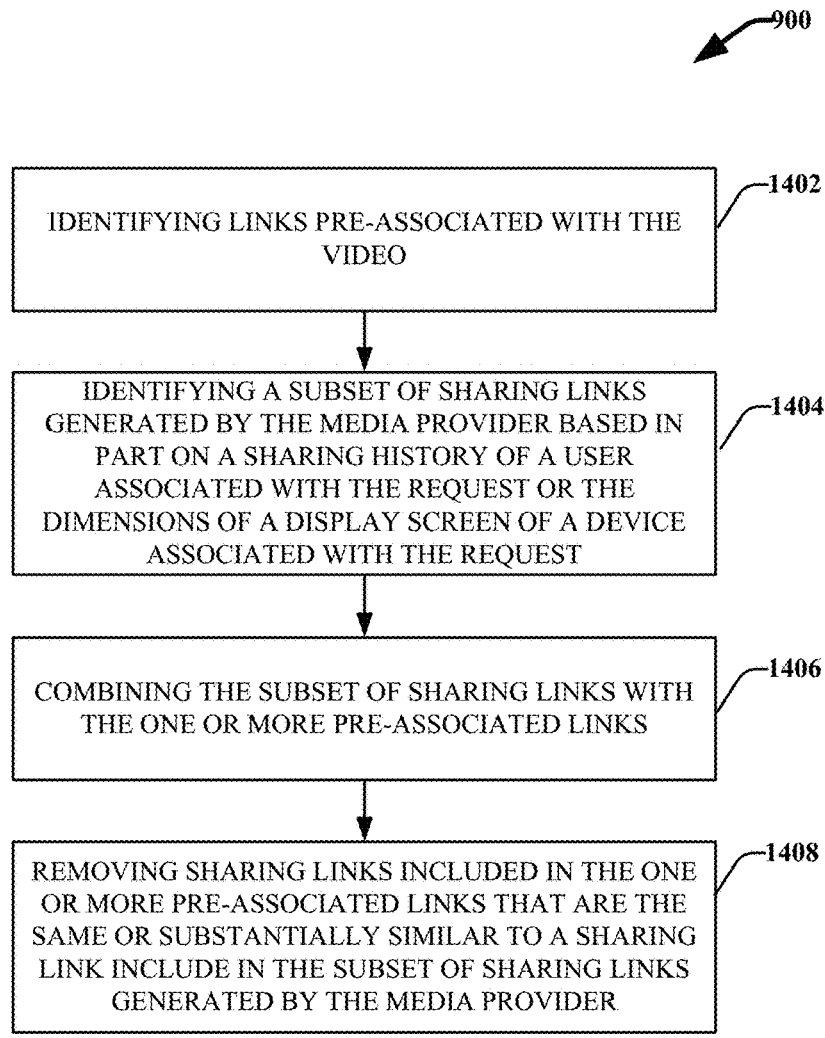
FIG. 14 presents a flow diagram of another example method for generating a set of links associated with a video in response to a request to play the video, in accordance with various aspects and embodiments described herein.

In view of the example systems and/or devices described herein, example methods that can be implemented in accordance with the disclosed subject matter can be further appreciated with reference to flowcharts in FIGS. 12-14. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 12 illustrates a flow chart of an example method 1200 for dynamically displaying hyperlinks in a video based on various factors associated with a device at which the video is played and a user of the device, in accordance with various aspects and embodiments described herein. At 1202, a request to play a video hosted by a media provider is received (e.g., by request component 106). At 1202, a subset of links included in a set of links associated with the video to provide with the video when it is played is selected in response to the request (e.g., by selection component 108). In an aspect, the selection is based in part on number of links included in the set of links, wherein elements respectively representative of the links included in the subset of links are configured to be displayed with the video when the video is played in response to the request. In another aspect, the selection is further based in part on context of a user or display device.

FIG. 13 illustrates a flow chart of another example method 1300 for dynamically displaying hyperlinks in a video based on various factors associated with a device at which the video is played and a user of the device, in accordance with various aspects and embodiments described herein. At 1302, a request to play a video hosted by a media provider is received (e.g., by request component 106). At 1304, a set of links associated with the video is generated in response to the request (e.g., via link set generation component 604). At 1306, a subset of links included in the set of links is selected for providing with the video when the video is played in response to the request (e.g., by selection component 108). In an aspect, the selection is based in part on number of links included in the set of links, wherein elements respectively representative of the links included in the subset of links are configured to be displayed with the video when the video is played in response to the request. In another aspect, the selection is further based in part on context of a user or display device.

FIG. 14 illustrates a flow chart of an example method 1400 for generating a set of links associated with a video requested for playing by a media provider in response to the request (e.g., via link set generation component 604). At 1402, links pre-associated with the video are identified. At 1404, a subset of sharing links generated by the media provider is identified. In an aspect, this subset of links is identified by dynamic sharing link component 606 based in part on a sharing history of a user associated with the request or the dimensions of a display screen of a device associated with the request. At 1406, the subset of sharing links is combined with the one or more pre-associated links. At 1408, sharing links included in the pre-associated links that are the same or substantially similar to a sharing link included in the subset of sharing links generated by the media provider, are removed.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 15:
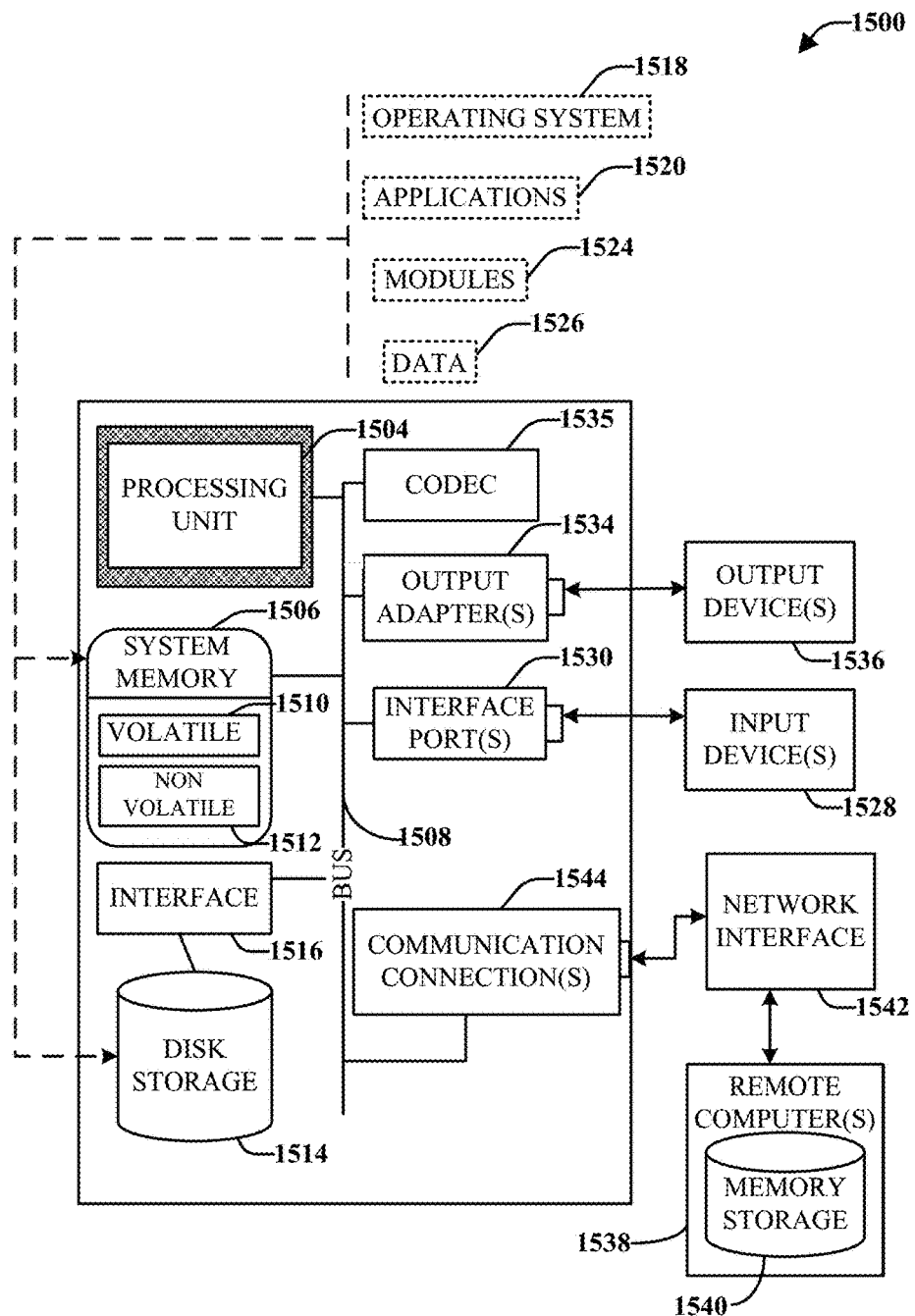
FIG. 15 is a schematic block diagram illustrating a suitable operating environment in accordance with various aspects and embodiments.

With reference to FIG. 15, a suitable environment 1500 for implementing various aspects of the claimed subject matter includes a computer 1502. The computer 1502 includes a processing unit 1504, a system memory 1506, a codec 1505, and a system bus 1508. The system bus 1508 couples system components including, but not limited to, the system memory 1506 to the processing unit 1504. The processing unit 1504 can be any of various available processors. Dual microprocessors and other multiprocessor architectures also can be employed as the processing unit 1504.

The system bus 1508 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13154), and Small Computer Systems Interface (SCSI).

The system memory 1506 includes volatile memory 1510 and non-volatile memory 1512. The basic input/output system (BIOS), containing the basic routines to transfer information between elements within the computer 1502, such as during start-up, is stored in non-volatile memory 1512. In addition, according to present innovations, codec 1505 may include at least one of an encoder or decoder, wherein the at least one of an encoder or decoder may consist of hardware, a combination of hardware and software, or software. Although, codec 1505 is depicted as a separate component, codec 1505 may be contained within non-volatile memory 1512. By way of illustration, and not limitation, non-volatile memory 1512 can include read only memory (ROM), programmable ROM (PROM), electrically programmable ROM (EPROM), electrically erasable programmable ROM (EEPROM), or flash memory. Volatile memory 1510 includes random access memory (RAM), which acts as external cache memory. According to present aspects, the volatile memory may store the write operation retry logic (not shown in FIG. 15) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1502 may also include removable/non-removable, volatile/non-volatile computer storage medium. FIG. 15 illustrates, for example, disk storage 1514. Disk storage 1514 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1514 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1514 to the system bus 1508, a removable or non-removable interface is typically used, such as interface 1516.

It is to be appreciated that FIG. 15 describes software that acts as an intermediary between users and the basic computer resources described in the suitable operating environment 1500. Such software includes an operating system 1518. Operating system 1518, which can be stored on disk storage 1514, acts to control and allocate resources of the computer system 1502. Applications 1520 take advantage of the management of resources by operating system 1518 through program modules 1524, and program data 1526, such as the boot/shutdown transaction table and the like, stored either in system memory 1506 or on disk storage 1514. It is to be appreciated that the claimed subject matter can be implemented with various operating systems or combinations of operating systems.

A user enters commands or information into the computer 1502 through input device(s) 1528. Input devices 1528 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1504 through the system bus 1508 via interface port(s)

1530. Interface port(s) 1530 include, for example, a serial port, a parallel port, a game port, and a universal serial bus (USB). Output device(s) 1536 use some of the same type of ports as input device(s). Thus, for example, a USB port may be used to provide input to computer 1502, and to output information from computer 1502 to an output device 1536. Output adapter 1534 is provided to illustrate that there are some output devices 1536 like monitors, speakers, and printers, among other output devices 1536, which require special adapters. The output adapters 1534 include, by way of illustration and not limitation, video and sound cards that provide a means of connection between the output device 1536 and the system bus 1508. It should be noted that other devices and/or systems of devices provide both input and output capabilities such as remote computer(s) 1538.

Computer 1502 can operate in a networked environment using logical connections to one or more remote computers, such as remote computer(s) 1538. The remote computer(s) 1538 can be a personal computer, a server, a router, a network PC, a workstation, a microprocessor based appliance, a peer device, a smart phone, a tablet, or other network node, and typically includes many of the elements described relative to computer 1502. For purposes of brevity, only a memory storage device 1540 is illustrated with remote computer(s) 1538. Remote computer(s) 1538 is logically connected to computer 1502 through a network interface 1542 and then connected via communication connection(s) 1544. Network interface 1542 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1544 refers to the hardware/software employed to connect the network interface 1542 to the bus 1508. While communication connection 1544 is shown for illustrative clarity inside computer 1502, it can also be external to computer 1502. The hardware/software necessary for connection to the network interface 1542 includes, for exemplary purposes only, internal and external technologies such as, modems including regular telephone grade modems, cable modems and DSL modems, ISDN adapters, and wired and wireless Ethernet cards, hubs, and routers.

Figure 16:
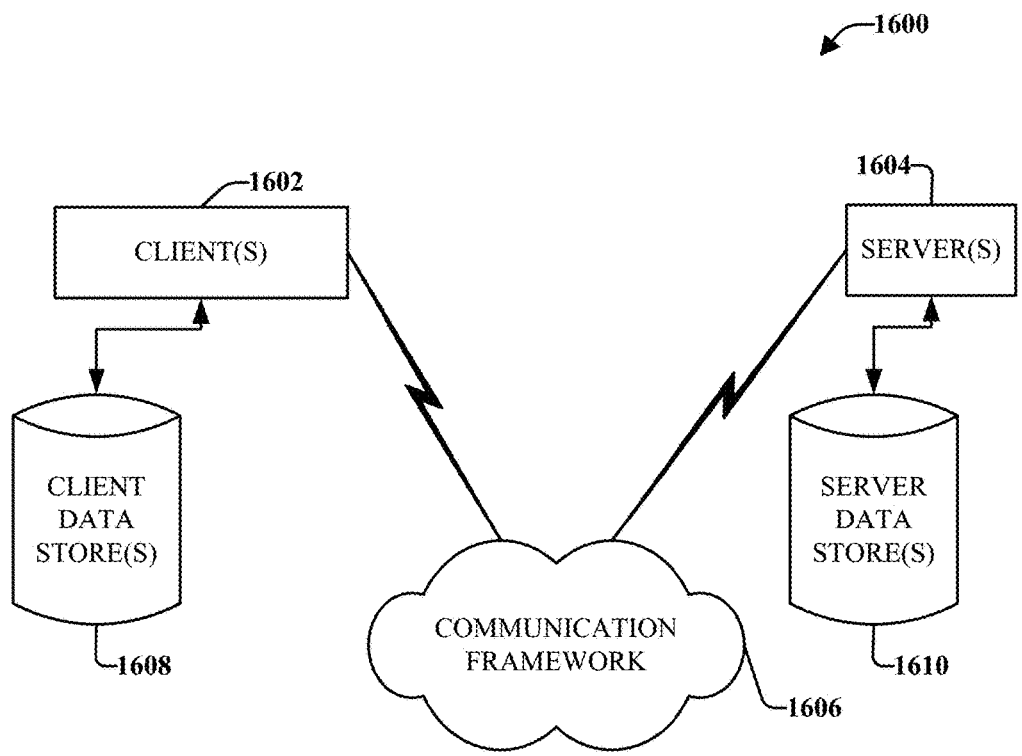
FIG. 16 is a schematic block diagram of a sample-computing environment in accordance with various aspects and embodiments.

Referring now to FIG. 16, there is illustrated a schematic block diagram of a computing environment 1600 in accordance with this disclosure. The system 1600 includes one or more client(s) 1602 (e.g., laptops, smart phones, PDAs, media players, computers, portable electronic devices, tablets, and the like). The client(s) 1602 can be hardware and/or software (e.g., threads, processes, computing devices). The system 1600 also includes one or more server(s) 1604. The server(s) 1604 can also be hardware or hardware in combination with software (e.g., threads, processes, computing devices). The servers 1604 can house threads to perform transformations by employing aspects of this disclosure, for example. One possible communication between a client 1602 and a server 1604 can be in the form of a data packet transmitted between two or more computer processes wherein the data packet may include video data. The data packet can include a metadata, e.g., associated contextual information, for example. The system 1600 includes a communication framework 1606 (e.g., a global communication network such as the Internet, or mobile network(s)) that can be employed to facilitate communications between the client(s) 1602 and the server(s) 1604.

Communications can be facilitated via a wired (including optical fiber) and/or wireless technology. The client(s) 1602 include or are operatively connected to one or more client data store(s) 1608 that can be employed to store information local to the client(s) 1602 (e.g., associated contextual information). Similarly, the server(s) 1604 are operatively include or are operatively connected to one or more server data store(s) 1610 that can be employed to store information local to the servers 1604.

In one embodiment, a client 1602 can transfer an encoded file, in accordance with the disclosed subject matter, to server 1604. Server 1604 can store the file, decode the file, or transmit the file to another client 1602. It is to be appreciated, that a client 1602 can also transfer uncompressed file to a server 1604 and server 1604 can compress the file in accordance with the disclosed subject matter. Likewise, server 1604 can encode video information and transmit the information via communication framework 1606 to one or more clients 1602.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A system, comprising:
a memory that stores computer executable components; and
a processor that, when executing the computer executable components stored in the memory, is configured to:
receive a request to playback a media content item;
identify a plurality of associated links corresponding to the media content item;
determine a plurality of sharing links based on device information associated with a device that provided the request to playback the media content item;
remove at least one associated link from the plurality of associated links that is similar to one of the plurality of sharing links to generate a set of combined links for association with the media content item;
generate a graphical element that corresponds to at least one combined link from the set of combined links; and
cause the graphical element to be presented while the media content item is being played back in response to the request.

2. The system of claim 1, wherein the plurality of sharing links are determined based on user viewing criteria associated with a user account of the device.

3. The system of claim 1, wherein the processor is further configured to select a subset of links from the set of combined links prior to generating the graphical element.

4. The system of claim 1, wherein the media content item is hosted by a media provider and wherein the processor is further configured to select a subset of links from the set of combined links based on a social network a user associated with the request has previously shared links to media content items provided by the media provider.

5. The system of claim 1, wherein the processor is further configured to select a subset of links from the set of combined links based on a location of the device associated with the request.

6. The system of claim 1, wherein the processor is further configured to select a subset of links from the set of combined links based on a size of a display screen of the device from which the request is made.

7. The system of claim 1, wherein the processor is further configured to select a subset of links from the set of combined links based on a size and shape of the respective graphical elements.

8. The system of claim 1, wherein the processor is further configured to select a subset of links from the set of combined links based on an operating system of the device from which the request is made.

9. The system of claim 1, wherein the media content item is hosted by a media provider and wherein the plurality of associated links are presented with the media content item in response to receiving the media content item at the media provider from an entity remote from the media provider.

10. A method, comprising:
receiving, using a hardware processor, a request to playback a media content item;
identifying, using the hardware processor, a plurality of associated links corresponding to the media content item;
determining, using the hardware processor, a plurality of sharing links based on device information associated with a device that provided the request to playback the media content item;
removing, using the hardware processor, at least one associated link from the plurality of associated links that is similar to one of the plurality of sharing links to generate a set of combined links for association with the media content item;
generating, using the hardware processor, a graphical element that corresponds to at least one combined link from the set of combined links; and
causing, using the hardware processor, the graphical element to be presented while the media content item is being played back in response to the request.

11. The method of claim 10, wherein the plurality of sharing links are determined based on user viewing criteria associated with a user account of the device.

12. The method of claim 10, further comprising selecting a subset of links from the set of combined links prior to generating the graphical element.

13. The method of claim 10, wherein the media content item is hosted by a media provider and wherein the method further comprises selecting a subset of links from the set of combined links based on a social network a user associated with the request has previously shared links to media content items provided by the media provider.

14. The method of claim 10, further comprising selecting a subset of links from the set of combined links based on a location of the device associated with the request.

15. The method of claim 10, further comprising selecting a subset of links from the set of combined links based on a size of a display screen of the device from which the request is made.

16. The method of claim 10, further comprising selecting a subset of links from the set of combined links based on a size and shape of the respective graphical elements.

17. The method of claim 10, further comprising selecting a subset of links from the set of combined links based on an operating system of the device from which the request is made.

18. The method of claim 10, wherein the media content item is hosted by a media provider and wherein the plurality of associated links are presented with the media content item in response to receiving the media content item at the media provider from an entity remote from the media provider.

19. A non-transitory computer-readable medium containing computer executable instructions that, when executed by a processor, cause the processor to perform a method, the method comprising:
receiving a request to playback a media content item;
identifying a plurality of associated links corresponding to the media content item;
determining a plurality of sharing links based on device information associated with a device that provided the request to playback the media content item;
removing at least one associated link from the plurality of associated links that is similar to one of the plurality of sharing links to generate a set of combined links for association with the media content item;
generating a graphical element that corresponds to at least one combined link from the set of combined links; and
causing the graphical element to be presented while the media content item is being played back in response to the request.

* * * * *